(12) United States Patent
Seale et al.

(10) Patent No.: US 8,463,720 B1
(45) Date of Patent: Jun. 11, 2013

(54) METHOD AND APPARATUS FOR DEFINING AN ARTIFICIAL BRAIN VIA A PLURALITY OF CONCEPT NODES DEFINED BY FRAME SEMANTICS

(75) Inventors: Jennifer Seale, Austin, TX (US); Hannah Lindsley, Austin, TX (US); Timothy Allen Margheim, Austin, TX (US)

(73) Assignee: Neuric Technologies, LLC, Houston, TX (US)

( * ) Notice: Subject to any disclaimer, the term of this patent is extended or adjusted under 35 U.S.C. 154(b) by 377 days.

(21) Appl. No.: 12/748,262

(22) Filed: Mar. 26, 2010

Related U.S. Application Data

(60) Provisional application No. 61/164,248, filed on Mar. 27, 2009.

(51) Int. Cl.
| | |
|---|---|
| *G06E 1/00* | (2006.01) |
| *G06E 3/00* | (2006.01) |
| *G06F 15/18* | (2006.01) |
| *G06G 7/00* | (2006.01) |
| *G06N 3/02* | (2006.01) |
| G06F 15/00 | (2006.01) |
| G10L 11/00 | (2006.01) |
| G10L 15/06 | (2006.01) |

(52) U.S. Cl.
USPC ............. 706/15; 706/20; 704/200; 704/202; 704/234

(58) Field of Classification Search
USPC ................. 706/15, 20; 704/200, 202, 243
See application file for complete search history.

(56) References Cited

U.S. PATENT DOCUMENTS

| | | | |
|---|---|---|---|
| 5,371,807 | A | 12/1994 | Register et al. |
| 5,406,956 | A | 4/1995 | Farwell |
| 5,918,222 | A | 6/1999 | Fukui et al. |
| 6,081,774 | A | 6/2000 | de Hita et al. |
| 6,269,368 | B1 | 7/2001 | Diamond |
| 6,330,537 | B1 | 12/2001 | Davis et al. |

(Continued)

FOREIGN PATENT DOCUMENTS
EP        1 006 452 A2     6/2002

OTHER PUBLICATIONS

Matuszek, David; "Basic Object Oriented Concepts", Fall 2002, [retrieved on Jun. 13, 2012]. Retrieved from the University of Pennsylvania Department of Computer and Information Science website: www.cis.upenn.edu/~matuszek/cit591-2002/Lectures/objects-concepts.ppt.*

(Continued)

*Primary Examiner* — Jeffrey A Gaffin
*Assistant Examiner* — James F Sugent
(74) *Attorney, Agent, or Firm* — Howison & Arnott, L.L.P.

(57) ABSTRACT

A method for defining a network of nodes is provided, each representing a unique concept, and making connections between individual concepts through unique relationships to other concepts. Each of the nodes is operable to store a unique identifier in the network and information regarding the concept in addition to the unique relationships.

4 Claims, 11 Drawing Sheets

U.S. PATENT DOCUMENTS

| | | |
|---|---|---|
| 6,353,810 B1 | 3/2002 | Petrushin |
| 6,415,257 B1 | 7/2002 | Junqua et al. |
| 6,513,006 B2 | 1/2003 | Howard et al. |
| 6,584,464 B1 | 6/2003 | Warthen |
| 6,601,026 B2 | 7/2003 | Appelt et al. |
| 6,611,841 B1 | 8/2003 | Han |
| 6,826,568 B2 | 11/2004 | Berstein et al. |
| 2002/0087346 A1* | 7/2002 | Harkey .............................. 705/1 |
| 2003/0130837 A1 | 7/2003 | Batchilo et al. |
| 2004/0054636 A1 | 3/2004 | Tango-Lowy |
| 2004/0181427 A1 | 9/2004 | Stobbs et al. |
| 2004/0193420 A1 | 9/2004 | Kennewick et al. |
| 2004/0243568 A1 | 12/2004 | Wang et al. |
| 2007/0156625 A1 | 7/2007 | Visel |

OTHER PUBLICATIONS

PCT: International Search Report and Written Opinion of PCT/US2006/000229; May 12, 2006; 7pgs.

PCT: International Search Report and Written Opinion of PCT/US2007/061580; Oct. 12, 2007; 33 pgs.

PCT: International Search Report and Written Opinion of PCT/US2008/072243; Feb. 27, 2009; 6 pgs.

PCT: International Preliminary Report on Patentability of PCT/US2008/072243; Feb. 9, 2010; 5 pgs.

* cited by examiner

| 3 | 5 BITS | I | 23 BITS |
|---|---|---|---|
| | Cmd | A | REMAINDER OF RELN |
| Opc | % | A | |

*Clump:2001*

| ROLE | RESOLVED NEURON ID | COMMAND |
|---|---|---|
| ROLE_CLUMP_VERB | jump | ROLE_ADD |
| ROLE_TASPECT | PRES | ROLE_ADD |
| ROLE_M_POSSIBILITY | may | ROLE_ADD |
| ROLE_ACTOR | the rabbit | ROLE_ADD |
| ROLE_EXPERIENCER | the carrot | ROLE_ADD |
| ROLE_MANOR | quickly | ROLE_ADD |

*Clump:2001*

| ROLE | RESOLVED NEURON ID | COMMAND |
|---|---|---|
| ROLE_CLUMP_VERB | jump | ROLE_ADD |
| ROLE_TASPECT | PRES | ROLE_ADD |
| ROLE_M_POSSIBILITY | may | ROLE_ADD |
| ROLE_ACTOR | *Clump: 2002* | ROLE_ADD |
| ROLE_EXPERIENCER | the carrot | ROLE_ADD |
| ROLE_MANOR | quickly | ROLE_ADD |

*Clump:2002*

| ROLE | RESOLVED NEURON ID | COMMAND |
|---|---|---|
| ROLE_CLUMP_VERB | bit | ROLE_ADD |
| ROLE_ACTOR | the rabbit | ROLE_ADD |
| ROLE_EXP | me | ROLE_ADD |

*FIG. 14*

*Clump:2001(CONTROLLER)*

| ROLE | RESOLVED NEURON ID | COMMAND |
|---|---|---|
| SENT_SEQ | Clump2002 | ROLE_ADD |
| SENT_CONTRAST | Clump2003 | ROLE_ADD |

*Clump:2002*

| ROLE | RESOLVED NEURON ID | COMMAND |
|---|---|---|
| ROLE_CLUMP_VERB | want | ROLE_ADD |
| ROLE_TASPECT | PRES | ROLE_ADD |
| ROLE_ACTOR | Luke | ROLE_ADD |
| ROLE_EXPERIENCER | Peanuts | ROLE_ADD |
| SENT_OWNER | *Clump:2001* | ROLE_ADD |

*Clump:2003*

| ROLE | RESOLVED NEURON ID | COMMAND |
|---|---|---|
| ROLE_CLUMP_VERB | got | ROLE_ADD |
| ROLE_TASPECT | PRES | ROLE_ADD |
| ROLE_ACTOR | Luke | ROLE_ADD |
| ROLE_EXPERIENCER | cashews | ROLE_ADD |
| SENT_OWNER | *Clump:2001* | ROLE_ADD |

*FIG. 15*

Clump:2002 - The rabbit bit Thomas.

| ROLE | RESOLVED NEURON ID | COMMAND |
|---|---|---|
| ROLE_CLUMP_VERB | bit | ROLE_ADD |
| ROLE_ACTOR | the rabbit | ROLE_ADD |
| ROLE_EXP | thomas | ROLE_ADD |

*FIG. 16*

Clump:2003 - The rabbit bit ~~Thomas~~ Luke.

| ROLE | RESOLVED NEURON ID | COMMAND |
|---|---|---|
| ROLE_EXP | Luke | ROLE_REPLACE |

*FIG. 17*

Clump:2003

| ROLE | RESOLVED NEURON ID | COMMAND |
|---|---|---|
| ROLE_CLUMP_VERB | bit | ROLE_ADD |
| ROLE_ACTOR | the rabbit | ROLE_ADD |
| ROLE_EXP | thomas | ROLE_ADD |
| ROLE_EXP | Luke | ROLE_REPLACE |

*FIG. 18*

METHOD AND APPARATUS FOR DEFINING AN ARTIFICIAL BRAIN VIA A PLURALITY OF CONCEPT NODES DEFINED BY FRAME SEMANTICS

CROSS-REFERENCE TO RELATED APPLICATIONS

This application claims the benefit of U.S. Provisional Application for Patent Ser. No. 61/164,248, filed on Mar. 27, 2009, and entitled "FRAME THEORY AND IMPLEMENTATION," the specification of which is incorporated herein in its entirety.

This application is related to U.S. patent application Ser. No. 12/136,670, filed on Jun. 10, 2008, and entitled METHOD AND APPARATUS FOR DEFINING AN ARTIFICIAL BRAIN VIA A PLURALITY OF CONCEPT NODES CONNECTED TOGETHER THROUGH PREDETERMINED RELATIONSHIPS," the specification of which is incorporated herein by reference.

U.S. patent application Ser. No. 12/136,670 claims the benefit of U.S. Provisional Application Ser. No. 60/954,247, filed Aug. 6, 2007 and entitled "RELATIONAL INTER-NEURON CONNECTIONS" and U.S. Provisional Application Ser. No. 61/016,918 filed Dec. 27, 2007, and entitled "DISCUSSION PATENT" and is a Continuation-In-Part Application of U.S. patent application Ser. No. 11/758,667, filed Jun. 5, 2007 and entitled "METHOD FOR DETERMINING RELATIONSHIPS THROUGH USE OF AN ORDERED LIST BETWEEN PROCESSING NODES IN AN EMULATED HUMAN BRAIN," which application claims benefit of U.S. Provisional Patent Application Ser. No. 60/811,299, filed Jun. 5, 2006, and entitled "THE CONCEPT OF GAMUT AND ITS USE," and is a Continuation-in-Part of pending U.S. patent application Ser. No. 11/697,721, filed Apr. 7, 2007, and entitled "METHOD FOR SUBSTITUTING AN ELECTRONIC EMULATION OF THE HUMAN BRAIN INTO AN APPLICATION TO REPLACE A HUMAN," which is a Continuation-in-Part of pending U.S. patent application Ser. No. 11/670,959, filed Feb. 2, 2007, and entitled "METHOD FOR MOVIE ANIMATION," which is a Continuation-in-Part of pending U.S. patent application Ser. No. 11/425,688, filed Jun. 21, 2006, and entitled "A METHOD FOR INCLUSION OF PSYCHOLOGICAL TEMPERAMENT IN AN ELECTRONIC EMULATION OF THE HUMAN BRAIN," which is a Continuation of U.S. application Ser. No. 11/154,313, filed Jun. 16, 2005, and entitled "METHOD FOR INCLUSION OF PSYCHOLOGICAL TEMPERAMENT IN AN ELECTRONIC EMULATION OF THE HUMAN BRAIN," now U.S. Pat. No. 7,089,218, issued Aug. 8, 2006, which is a Continuation of abandoned U.S. application Ser. No. 11/030,452, filed Jan. 6, 2005, and entitled "A METHOD FOR INCLUSION OF PSYCHOLOGICAL TEMPERAMENT IN AN ELECTRONIC EMULATION OF THE HUMAN BRAIN," which claims the benefit of U.S. Provisional Application for Patent Ser. No. 60/534,641, filed Jan. 6, 2004 entitled "A NEURIC BRAIN MODELING SYSTEM IN THE MILITARY ENVIRONMENT," U.S. Provisional Application for Patent Ser. No. 60/534,492, filed Jan. 6, 2004, entitled "METHOD FOR INCLUSION OF PSYCHOLOGICAL TEMPERAMENT IN AN ELECTRONIC EMULATION OF THE HUMAN BRAIN," U.S. Provisional Application for Patent Ser. No. 60/534,659, filed Jan. 6, 2004, entitled "DESIGN OF THE NEURIC BRAIN," and which U.S. application Ser. No. 11/697,721, filed Apr. 7, 2007, and entitled "METHOD FOR SUBSTITUTING AN ELECTRONIC EMULATION OF THE HUMAN BRAIN INTO AN APPLICATION TO REPLACE A HUMAN" also claims the benefit of priority from U.S. Provisional Application for Patent Ser. No. 60/764,442, filed Feb. 2, 2006, and entitled "USE OF THE NEURIC BRAIN MODEL IN MOVIE ANIMATION" and U.S. Provisional Application Ser. No. 60/790,166, filed Apr. 7, 2006, and entitled "BRAIN MODEL". All of the above are incorporated herein by reference in their entirety.

BRIEF DESCRIPTION OF THE DRAWINGS

For a more complete understanding, reference is now made to the following description taken in conjunction with the accompanying Drawings in which:

FIG. 12a illustrates a diagram of the system linkage to clumps;

FIGS. 13-18 are tables illustrating various clumps; and

DETAILED DESCRIPTION

Figure 1:
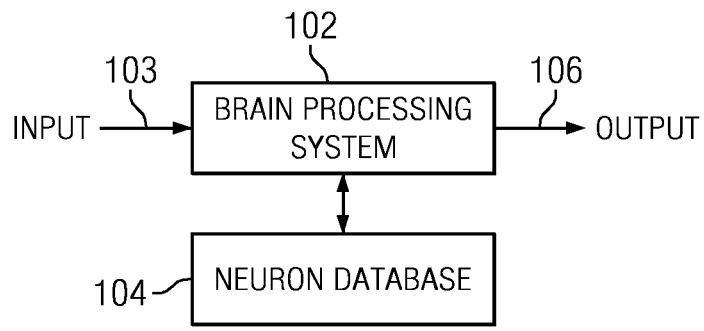
FIG. 1 illustrates an overall block diagram of a general artificial brain and the associated neuron database.

Referring now to the drawings, wherein like reference numbers are used herein to designate like elements throughout, the various views and embodiments of a method and apparatus for defining an artificial brain via a plurality of concept nodes connected together through predetermined relationships are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated a general block diagram of the processing system that represents the artificial brain. In general, the brain processing system is referred to by a reference numeral 102. It is operable to receive an input on an input line 104 and provide an output on an output node 106. Input 103 can receive inputs such as speech, text or some sensory input and the output on node 106 can be an action, text or the such. It should be understood that any type of input can be accommodated that provides some sort of information to the system, either static or dynamic. In one implementation of the artificial brain, the system will have a discourse with a user. The user will input text in the form of a query (or input voice that is translated to text or some similar machine recognizable form). For example, the input may be a question that may ask the system to "show me the tree," which is then interpreted by the system to possibly display a picture of a tree. It may be that the system detects some type of ambiguity in that it does not understand whether the query is trying to ask it about a plant or a graph, as the term "tree" could be the plant defined as a tree or it could be a graph that is in the form of a tree structure. In this situation, the output would be a question to the user asking whether the user means the plant or the graph. Another input would then be received indicating that it was the plant. The system would then process this further. However, if the user had indicated the query as show me the tree that was to be cut down, it is then possible, based upon the level of training in the artificial brain to determine that there is some type of learned association between the concept of "cut" and the tree as a plant as opposed to the tree as a graph. In that situation, no additional query would be required. Of course, this is a very simple example of the type of input that could be received and the type of output that could be provided. Additionally, in the flow of the discourse, it could be that the context was sufficient to discern that a tree was the plant type as, for example, a previous query could have been directed towards walking in the woods to find a "tree." This context is maintained in an ongoing contextual list. In this situation, the brain itself can resolve an ambiguity and no clarifying query would be required.

The brain processing system 102 interfaces with a nodal array 104 comprised of a plurality of individual neuron nodes, hereinafter referred to as "neurons. The nodal array 104 is operable to store in each of the plurality of neurons a unique concept. This concept can relate to a hard object or an abstract idea. For example, the concept could be the concept of a tree in a plant based context. It could also be the concept of a "truck." Further, it could be related to the concept of a "fire truck." Any complex number of words could define a particular concept and this particular concept does not necessarily require that it be a single word but, rather, it can be a combination of words and could even include the concept embodied in a phrase.

As will be described herein below, each concept has some type of relationship with other concepts, when taken in the context of a sentence. In order to have any type of discourse or to relay a particular overall concept in a discourse, a plurality of individual concepts are organized in a particular sequence and organization. Therefore, it is the structure and sequence of an individual concept in a particular manner which defines an idea or a "conceptual flow." The details of this conceptual flow will be described in more detail herein below.

Figure 2:
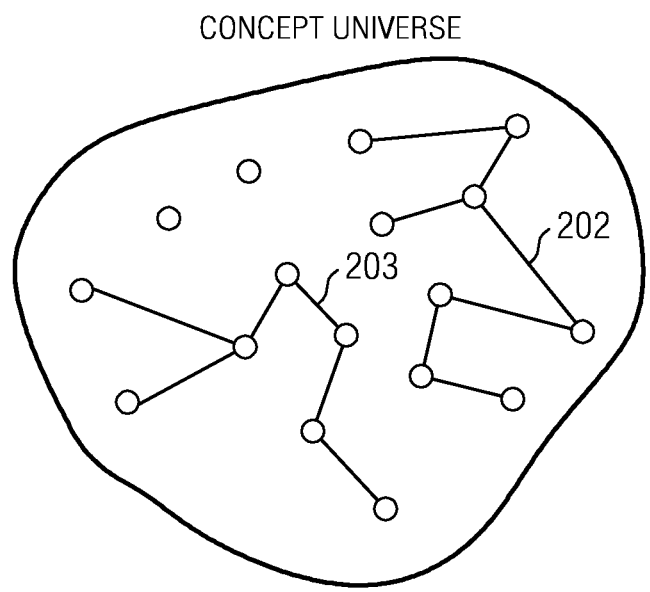
FIG. 2 illustrates the concept organization.

Referring now to FIG. 2, there is illustrated a diagrammatic view of the concept universe. There are illustrated a plurality of nodes (neurons, noting that "node" and "neuron" will be utilized interchangeably throughout), each representing an individual concept. One could be the concept of a particular verb, one the concept of a particular noun, etc. Each of these concepts has a group of relationships associated therewith. For example, a particular sentence could be utilized in a discourse wherein it was stated that "A leopard named Egor is in the cat family and has white fur and wears a red collar." There are a plurality of relationships that exist within this sentence. First, if the relationships did not previously exist, there would be a neuron for the concept of leopard created and a relationship generated between leopard to a previously existing neuron defined as the "cat" neuron. This would be created in such a manner wherein the relationship created is defined as being the "parent" relationship between the "leopard" concept and the "cat" concept, i.e., a "parent" relationship. There would also be an "instance of" relationship created between the leopard neuron and the name "Egor." There would be a "possession" relationship between the "Egor" neuron and a neuron for "red collar." If the concept "red collar" previously existed as a concept for a neuron, then the relationship would be created in the "Egor" neuron to the "red collar" neuron. There would also be created what is termed a "back relationship" from the "red collar" neuron to the "Egor" neuron. This will be described in more detail herein below when specific relationships are referred to. For the rest of this discussion, relationships between neurons will be called "relns" or a relationship "reln." An additional relationship would be an attribute which would show that an attribute of the specific "Egor" neuron would be directed to the "white" neuron, assuming this concept embodied in a neuron previously existed.

When defining a particular grouping, i.e., a sentence, all that is necessary is to define the concepts that are defined in this grouping, a sentence making a logical grouping in natural language, and then define the relationships between the various concepts. Once the concepts in a grouping, i.e., a sentence, and the relationships between those concepts, is defined, the overall idea or concept of the sentence or logical grouping is defined. This can be further extended to a paragraph, a chapter in an overall book, etc. Again, this will all be described in much more detail herein below. Referring back to FIG. 2, there are illustrated a plurality of neurons, each defining concepts. There is defined a first grouping 202 and a second grouping 203. These each being independent groupings. A particular grouping of concepts and their relationships would be associated with, for example, a particular sentence.

Figure 3:
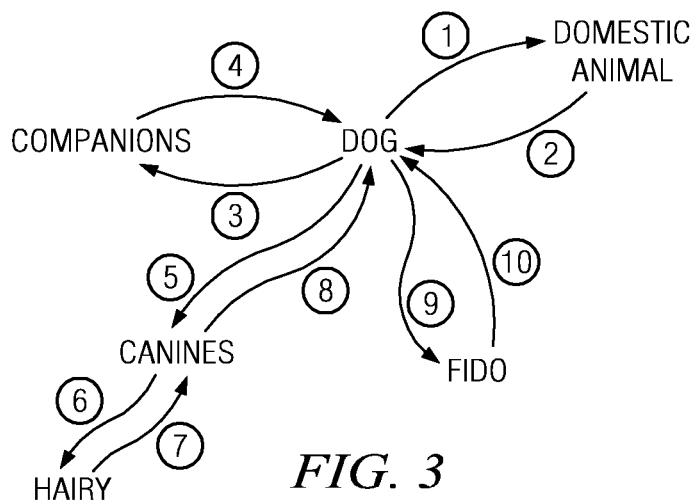
FIG. 3 illustrates a diagrammatic view of one concept flow.

Referring now to FIG. 3, there is illustrated a diagrammatic view of a conceptual flow in a particular overall conceptual flow. The following sentence is that which is represented by the conceptual flow of FIG. 3:

A dog is a domestic animal. Dogs are companions. Dogs are members of the canine family and they are hairy. A dog I know of is named Fido.

The sequence flow would then go between various neurons. In this example, there is the "dog" neuron, the "domestic animal" neuron, the "companions" neuron, the "Fido" neuron, the "canine" neuron and the "hairy" neuron. The flow of a sentence would be the first relationship between "dog" and "domestic animal" along a first path represented by ①. There would be a second flow from "domestic animal" back to "dog", as there is a relationship from "dog" to "domestic animal" which is one of parentage, i.e., "dog" is a member of the "domestic animal" category. The relationship between "domestic animal" and "dog" is one where "dog" is a child of the "domestic animal" category (a back reln). There will then be the next relationship defined which is between "dog" and "companions." There will be a relationship at the "dog" neuron indicating that the "companions" neuron is an associative relationship, which will have a back relationship with the ④ relationship. Thus, dog will have a stored relationship to "companions" and companions will have a stored relationship back to "dog." It is understood that stored in the "dog" neuron is the relationship to other neurons and not the relationship "from" other neurons, i.e., all that is important for the dog neuron is to know that it has an associative relationship to the companion neuron and not to know that the companionship neuron has a back relationship to the dog neuron. In a similar manner, the next relationship in the flow will be the relationship of the "dog" neuron to the "canine" neuron, which is one of parent/child.

The "dog" neuron indicates that there is a parent relationship to the "canine" neuron and the "canine" neuron will indicate a child relationship back to the "dog" relationship. Thus, the "child" relationship is not stored in the "dog" relationship. There will then be a relationship defined between "canine" and "hairy," this being an associative relationship. The last relationship will be the instance_of relationship to the "Fido" neuron. There will be a relationship in one direction to "Fido" that is an instance relationship and the back relationship from "Fido" to "dog" will be a "instance_of" relationship. These relationships will be described in more detail herein below.

As noted herein above, the nodal array and the overall information stored for the artificial brain is comprised of a plurality of concept neurons that are interconnected together with various relationships. That is to say, one particular neuron may have thousands of potential relationships to other neurons. For example, the "dog" neuron may be related to the "canine" neuron, the "dog body" neuron, the "fur" neuron, etc. However, until some conceptual flow occurs such as that associated with a particular sentence, these relationships mean nothing. It is when the concept flow is disposed in some organized and structural conceptual manner that these concepts give meaning to a particular overall idea that is conveyed by the sequence, structure and organization of the particular grouping and flow of concepts.

Figure 4:
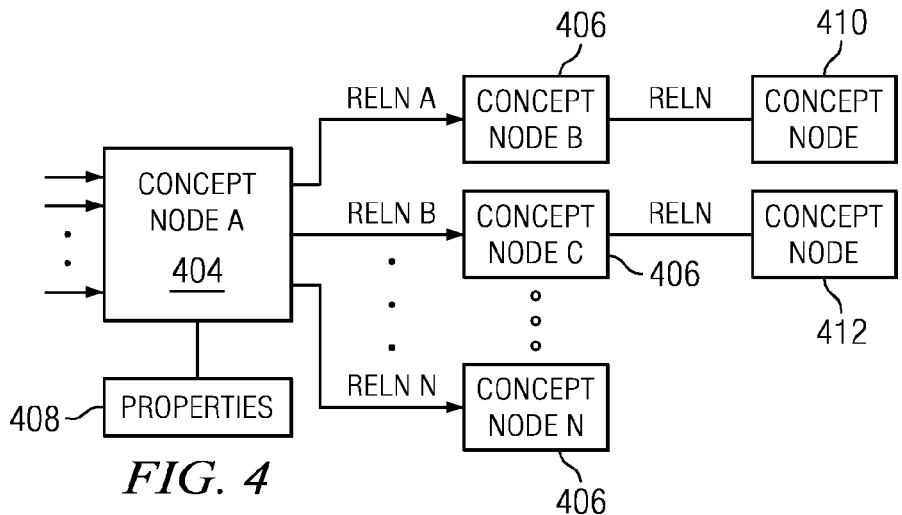
FIG. 4 illustrates a block diagram of a plurality of neurons showing the interconnection thereof through relationships.

Referring now to FIG. 4, there is illustrated a single concept node or neuron 404 that is associated with a plurality of other concept nodes 406 labeled concept node b, concept node c . . . concept node N. Each of the concept neurons or nodes has associated with it a set of properties in a block 408 defining certain aspects of a particular neuron. For example, if the concept neuron were the concept of a branch of a tree, the property block might include such things as it being thin, having a size less than a particular diameter, being made of wood, fiber, etc. These are certain things that are fixed with respect to the properties thereof. Although not discussed in the parent applications herein, which were incorporated herein by reference, it should be understood that concept neurons can be created with certain properties such as the type of word they are, i.e., noun, verb, etc., and they can have defined properties associated therewith. Alternatively, these concept neurons can be "learned" neurons. There can be text neurons, there can be identity neurons, etc. However, each neuron or node constitutes a particular concept of either a hard object or an abstract idea. It is defined in the system by a neuron ID "NID" which is all that is necessary to refer one neuron to another, i.e., it is a flow of NIDs. {????}

Referring back to FIG. 4, the particular neuron 404 is defined as having a plurality of relns to the other neurons or nodes 406. There can be thousands of these relns which can number as high as 32K relns per neuron. These relns are useful when querying the knowledge set that includes the nodal array of neurons about particular relationships. For example, it may be desirable to determine information about a dog. The nodal array would go in and determine the closest relationships and then the most distant relationships. For example, it might first determine that dogs are canines and that dogs possess a dog body. It then may go one more step and determine that, since the dog exists in a dog body, it possesses paws and then a further relationship would be that it possesses claws because it possesses paws. The direct relationship would be the immediate relationship to a particular neuron and then a more distant relationship, i.e., removed by one relationship, would be a further relationship. The query could be defined in terms of specific relationships, one example being a "made_of" relationship that defines some neuron that constitutes the makeup of a particular object. A dog body, for example, would be made of paws, a tail and hair, for example. One could query what is a dog made of and the database would look to the closest made_of relationships for the purpose of responding to the query. Again, all the database query has to do is look to the relationships to determine how to generate a particular response.

Thus, referring back to FIG. 4, all of the potential relationships, which are direct relationships, flow to the concept nodes 406. Each of the concept nodes 406 can then flow to other concept nodes, illustrated as concept nodes 410 with respect to concept node B, and concept nodes 412 are associated with concept node C. Thus, if the relationship desired were that of two steps down from concept node 404, it is possible to determine a relationship between concept node 404 and concept node 410 by allowing the relationship to be taken two steps down. By defining the query in terms of the relationship, the particular relationship path can be defined. Thus, until a query is made or a sentence is constructed, all of the relationships between particular concept nodes are "potential" relationships.

From the standpoint of how a neuron is defined, a word can be parsed from a particular sentence that exists within a particular paragraph or discourse and "conceptualized" into the particular neuron, wherein the properties of that neuron may be defined and the relationships between that particular concept and other concept neurons defined. There in the conceptualization process, the relationships are defined between various other neurons that exist within the particular discourse. It may be that the discourse results in a new relationship that will be presented. For example, if the discourse indicated that "the dog has a red collar." The indication would be that there is a POSSN (possession) reln between the "dog" neuron and a "red collar" neuron, which may have previously existed. These relationships would result in the "dog" neuron, which already exists, possibly having a POSSN reln pointing to the "red collar" neuron and a POSSN_OF reln stored at the "red collar" neuron pointing back to the "dog" neuron. This is how a relationship would be defined as a result of a particular input discourse, this being described herein below in more detail. In general, as noted herein above multiple times, every unique concept to be known is embodied as a single neuron. While all neurons are essential identical, the truly important information is not what is stored within them (or their specific characteristic) but how they are interconnected with other neurons. It is these connections that define a concept for what it is, i.e., its unique relationships with other concepts within the system. These relationships can be fixed or they can change. Some can be temporal, i.e., they disappear, or not. As will be described herein below, most of these relns, i.e., the relational connections, are non-weighted, but there are some that are weighted. There are some that are bi-directional connections between two neurons such as the ASOC reln and other concepts required to separate relns, such as the PARENT and CHILD relns. In general, when discussing the general context or flow of concepts, one has to view communications of a concept or a thought. In general, words are used to communicate a concept or a thought. The predominant memory mechanism of human beings is a storage of the concept or thought, not the words by which it was conveyed. There are memory mechanisms that do store exact text, such as memorizing the Declaration of Independence, but this is not addressed herein. The matter of conceptual memory exists across all cultures, because all languages intend to convey something through the use of words. The use of the concept nodes and the relational interconnections is provided to represent overall concepts, ranging from the simplest to the more complex concepts. A listener, in general is like a parser—a translator of text—trying to arrive at the greater meaning that words in and of themselves attempt to convey. Text comes in through various channels and it is broken down and processed.

Concepts are remembered in one of four basic types of neurons. The first is a simple neuron. This is one wherein a single concept is stored in a single neuron or node, where the neuron is simply a place-holder for that concept. As described herein above, relational connections, "relns," are provided to other concepts (or words) that give the neuron meaning within the overall context of the brain to provide a knowledge set. These simple neurons store relationships between concepts in a factual manner. For example, the word "dog" forms a "dog" neuron, and that neuron is linked through a reln to other neurons that help to establish the concept of the dog in the system. This may be simply a single neuron or multiple neurons requiring multiple relns. Neuron IDs (NID) for both simple and complex neurons share the same number space.

Complex neurons are another type of neuron, which are required in that there are occasionally repeated references to nouns that have a qualifying adjective, such as "black dog." A complex neuron is created to handle such cases. The complex neuron and its associated concept carries all the implications of "dog" and the qualification of "red," for example, but without the overhead of its own copy of all the linkages. This is due to the fact that the complex "red dog" concept can be viewed in a single concept, albeit requiring two words to convey that concept in text.

By comparison, when referring to a specific dog (such as "that dog") that has particular traits or associations, a simple concept neuron is created. The simple neuron refers to a specific instance of "dog" and is connected to "dog" by an INST_OF "dog" and from "dog" to "that dog" by an INST reln.

An additional type of neuron is referred to as the "clump" neuron. This is the concept of gathering "clumps" of information about an action that has taken place and garners with it all the history of that particular action or event. As such, every clump neuron contains a connection to a verb (a distinguishing characteristic). Such clumps are the repository for actions taken by nouns, and each such clump implies what can be viewed as the content of an independent clause, with a variant handling dependent clauses. In general, the brain parses a sentence and outputs a single Conceptual Clump which stores the parsed "thought." Conceptual Clumps store the thought and not the words, i.e., it is the semantic organization of concepts for that particular sentence, it being understood that a sentence is normally thought of as defining a particular single thought (keeping in mind that some sentences convey multiple thoughts and they have to be dealt with separately). In storing just the thought or the sequence of concepts, the capability of capturing a diverse collection of input streams or concepts (i.e., "concept flows") is provided for. The possibility of analyzing these different streams as being conceptually equal is also accounted for, and providing a diverse range of sentence regeneration for creating an output is also provided for. This will be described in more detail herein below in defining conceptual flows. In general, as will further be described herein below, one Conceptual Clump is a basic sentence clump that, at its most basic level, takes the words and phrases of a sentence and converts them to a series of semantic roles, one of which is the PAS verb wherein the main verb that assigns most of the other roles of a particular clump are defined. Further, as will be described herein below, each Conceptual Clump is defined as providing a role. It is both a neuron that has a defined set of concepts associated therewith such that it points to these particular concept neurons with a particular reln defining the relationship of that particular concept with the "clump" (that being a sentence) and also defines the role of the clump. There are multiple roles associated with clumps, however, which will be described and set forth herein below.

Figure 5:
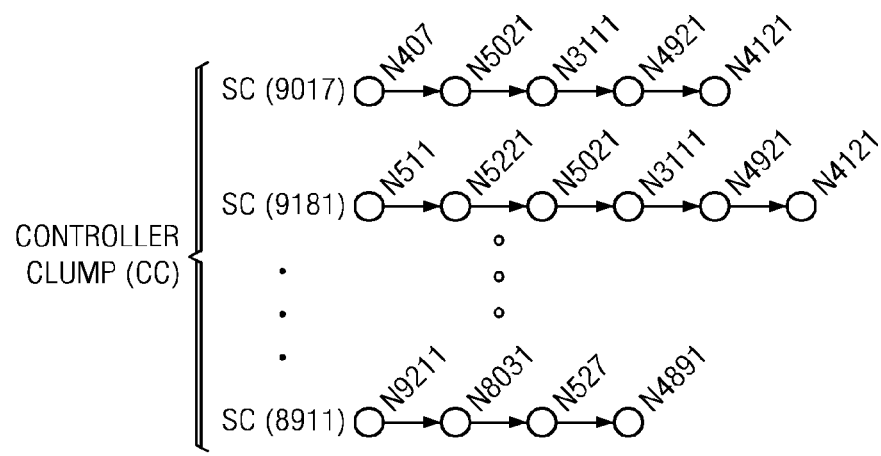
FIG. 5 illustrates a diagrammatic view of various relationship flows defined as clumps.

Referring now to FIG. 5, there is illustrated the idea of how conceptual flows can be represented. There is a type of clump that is called a Sentence Clump (SC) that defines particular neurons associated therewith and the flow thereof. These are illustrated as a linear flow but they are really not related as such. For example, a particular SC could define the various concept neurons as being nouns, verbs, adjectives, objects, etc. However, they are represented linearly just to show they have some relationship within a particular SC. In a particular discourse, which could be sentences in a paragraph, there are illustrated a plurality of SCs. One SC is defined by the Clump ID (CID) of "9017." There is also provided an SC "9181" and an SC "8911" with multiple SCs possibly contained there between. The entire group of SCs are organized in what is referred to as a Controller Clump (CC). In general, the flow of thought usually ties sentences together with conjunctions, or through punctuation functioning as conjunctions (assuming conjunctions). The Controller Clump is the way to store information at a much higher level. The Controller Clump provides a linear progression of the thought of a sentence. This is typically a logical progression (i.e., Want, then realization, expectation then reality). The Controller Clump is basically the essence of connected thoughts in a particular grouping of ideas defined by sentences. This, again, will be defined in more detail herein below.

Figure 6:
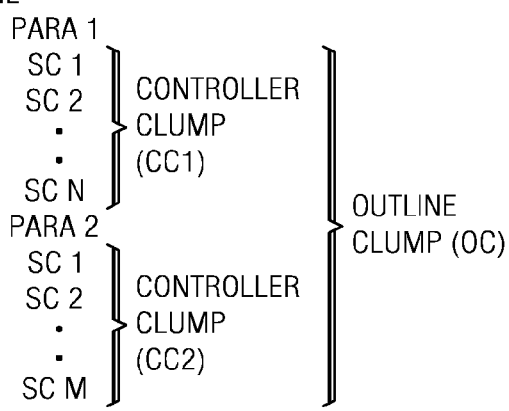
FIG. 6 illustrates an alternate diagrammatic view of the organization of clumps.

Referring now to FIG. 6, there is illustrated an alternate diagrammatic view of how a sequence of ideas can be defined. In a discourse, there are typically paragraphs, i.e., logical breaks between discrete sets of ideas. The sentence describes a particular thought and various sentences in a paragraph define a logical progression of those thoughts which are grouped together in some logical manner. Two sequential paragraphs define two thought groups. Thus, there can be illustrated a first paragraph Para1, which has associated therewith a plurality of sentence clumps, SC1, SC2, . . . SCN. This is referred to as Controller Clump, CC1. The second paragraph, Para2, has sentence clumps, SC1, SC2, . . . SCM, tied together as a Controller Clump, CC2. What this all provides, at an even higher level, is an Outline Clump (OC). This is basically a larger-view picture of where the textual material is heading, i.e., it provides a scope or outline for a topic, e.g., "Where is this book going?" An Outline Clump could summarize a paragraph or it could provide a summarization of chapters in the book (if appropriate).

Figures 7, 8:
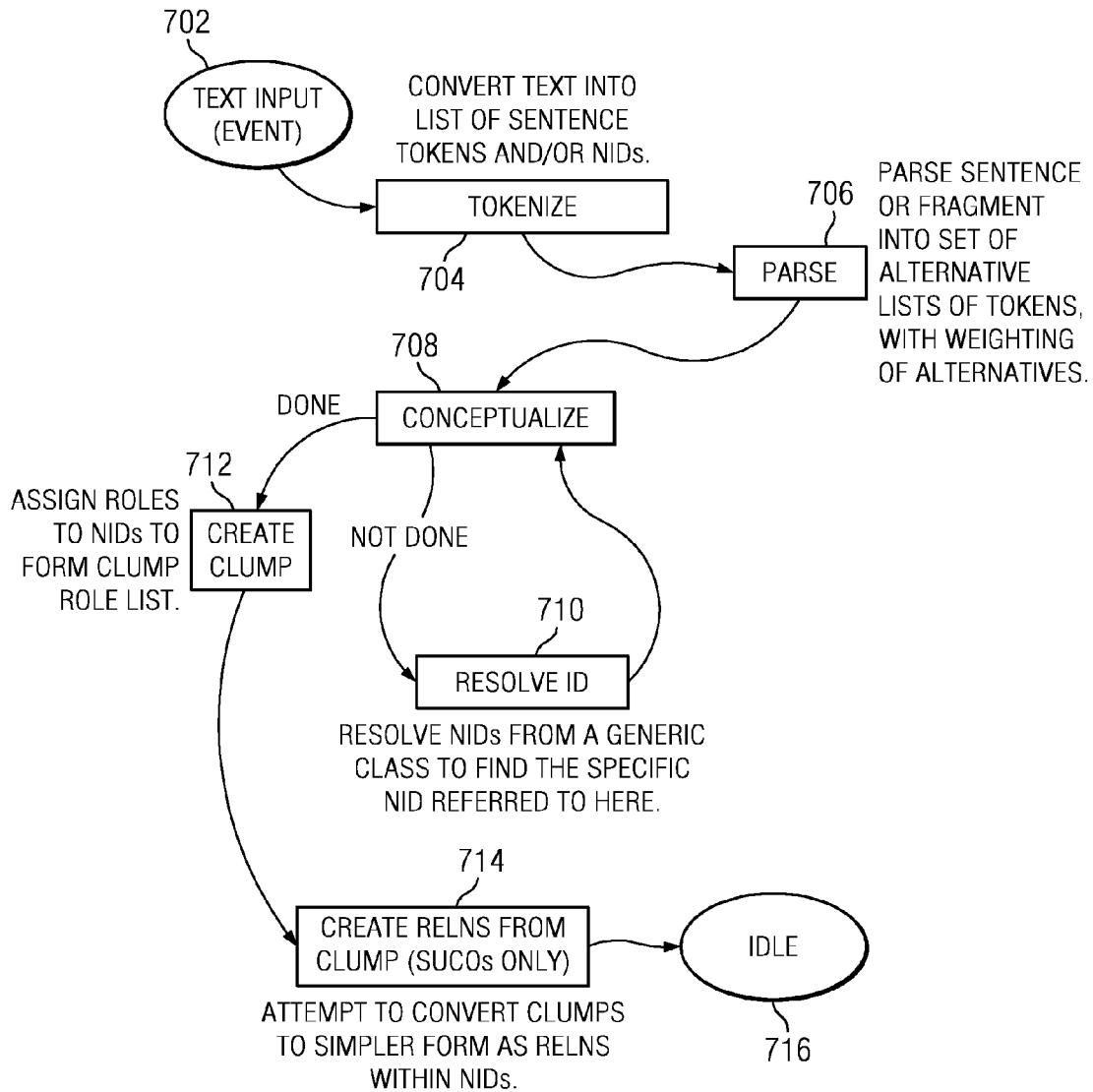
FIG. 7 illustrates a block diagram of the general overall artificial brain and the operation of receiving a textual input and providing an output.
FIG. 8 illustrates a diagrammatic view of the NID.

Referring now to FIG. 7, there is illustrated the general structure for parsing the English language based upon an input, be it some type of text or verbal input and conceptualizing that. This will be described further herein below. Additionally, the general structure for the system for storing the concept neurons, etc., will also be described herein below. For the purpose of this discussion, it is necessary to determine how concepts can flow in a particular sentence and the structure will provide some benefit. The event or text input is provided at a block 702 and this is input to a tokenizer 704. The tokenizer is basically operable to convert the text into a list of sentence tokens and/or NIDs. The tokenizer is an input to a parse block 706 to parse a sentence or fragments thereof into a set of alternative lists of tokens, with weighting alternatives. This is then output to a conceptualize block 708 that is operable to determine the concept behind particular words as they exist within a sentence. This then passes to a resolve block 710 to resolve the NIDs from a generic class to find the specific NID referred to by this particular word as it exists within the sentence. Once completed, a clump is created at a block 712 which assigns roles to groups of NIDs to form both the group of NIDs and the role associated therewith. This block then flows to a block 714 to create the relns from the clump. This is an attempt to convert the clumps to simpler form as relns with associated NIDs. This will then provide a completion of the operation, at a block 716.

In general, the parser is a natural language parser which can utilize many different types of approaches. The type that is used in the present embodiment is a predicate-argument-parser using a Backus Nauer Form (BNF) layout description for the language. Actually, while some areas of the parser make use of conventional "predicate argument structure" (PAS) common in linguistics, it is not essential for operation. This BNF form is one of choice and many others could be used and are anticipated such that the use of such is not limiting and other parsers could be utilized to provide the parsing operation.

The tokenizer block 704 is the operation wherein incoming sentences are broken down into "tokens," items corresponding to individual words and punctuation, but in which the words have already been located by some form of internal serial number, if they were already known. Therefore, this simplified list (non-text) is then forwarded to the parser for subsequent processing.

The parse block 706 is the device that breaks the sentences into its simpler parts, wherein the parser is defined by a top-down description of the language. In the particular parser algorithm utilized, a Backus Nauer Form (BNF) is utilized which is a natural language C++ parser for the description of the English grammar which is utilized to translate English grammar to computer language. Thus, the tokenizer initially breaks the sentence into items corresponding to individual words and punctuation and then the parser breaks the sentences down into their simpler parts and the constituent parts are saved in some manner. This is, in general, a "semantic" parser, and is driven largely by the grammar and syntax of valid sentences. These stacks of constituent parts are then passed on to the conceptualize block 708 to allow them to be converted into clump neurons. A "clump" as defined herein is a form of a neuron that remembers something that relates to action, aspect, or is only true for a specific time, such as "tomorrow." Technically, any phrase—dependent or independent—can be formed into a clump, though that may be a poor use of memory space. Those phrases or clumps that simply define something, such as "all birds fly," are more simply stored as relationships between simple neurons. A large class of information can be stored in this manner, although storing in neurons (not clump neurons) becomes impractical under many cases. In the system described herein, all sentences are formed into clumps; subsequent processes determine if they should be converted to neurons relns and deleted, or be permitted to remain. The main operations of conceptualization are:

1. Resolve classes to instances of neurons (e.g., My parakeet Fiji with an NID of "6921," from the "parakeet")
2. Create one or more clumps for each of the parsed history logs or lists.
3. Convert the lists or logs and resolve NIDs into Roles in a clump (wherein Roles will be described herein below).
4. Manage the recycling of not-to-be-used trial clumps (which will be described herein below as temporary groups of neurons that will not be stored for a long duration of time but will be used only for temporary reasons).

In general, the parser builds many useful lists of data that include a history of recent content in a context pool (a context pool is comprised of relns recently used, i.e., the history thereof, and which may or may not have a temporal aspect thereto, i.e., they will decay after a period of time if they have not reoccurred in the discourse so as to be reset. This provides some knowledge of the recent history of the discourse.), and some of the utilities are called on by the conceptualize block 708 in order to resolve classes (general families) of neurons into specific neurons relating to the current topic. Some clumps can be reused (shared) by several other clumps as can sentence fragments that occur multiple times, such as prepositional phrases. "Bats fly at night" and "Of course, you may find bats near the bridge this evening because bats fly at night" share a common "semantic" clump. A higher level "controller" clump manages the connection of phrases and concepts to each other whereas the "Outline Clump" summarizes the content of the paragraph. As with regular neurons, clump neurons may be later discarded—not remembered—if not re-validated over a twenty-one-day period (described herein below).

Certain types of clumps are purely definitive in nature, and their data is more properly stored in a set of relationships between simple neurons. An example of this would be "The sky and water are blue." These are definitive statements, as is "My dog has four paws." This example shows possession, a static condition which can be stored as a central concept. Example statements that can be converted to relns include:

1. Subjective Compliments-"These floors, which are wet with rain."
2. Possessive-"My dog has four paws."
3. Part-ofs-"The engine includes a block, a carburetor, and several manifolds."
4. Membership-"A cat is a member of the feline species (I think)!"

A clump that was converted to relns may be deleted or may be retained for further use by the control or outline clump. After the conversion process, the parse-to-clump process is concluded.

Neuron Relns

As noted herein above, connections between normal neurons in the brain are made through "relationals," "relns" for short. Relns for other types of neurons (e.g., clump or identity neurons) have special relns and are given other names such as Roles for clump neurons. Each type of neuron has its own numbering sequence (or number space) for enumerating their relational connections.

For normal neurons, the relns are divided into two categories, those with weighted connections and those without weights. The structure of a reln in the data space is depicted in FIG. 8. Each reln has an 8-bit field in the Most Significant Bits (MSBs) that specifies the type of reln, this being the Cmd field. The 8-bit Cmd field may be divided into separate Opc and Percentage sub-fields. This would be a 3-bit Opc field and a 5-bit Cmd field. There is provided a single 1-bit field that is associated with an Adhoc flag and the remaining bits, 23-bits, constituting the remainder of the reln. The Adhoc flag defines the bit as a temporary or a real reln, as will be described herein below. The 23-bit neuron field comprises the serial number therefore of the neuron or of the clump. The Cmd field for a non-weighted neuron relns utilizes the entire 8-bit filed such that a maximum of 255 relns can be defined. This, of course, is up to the system designer as to how relns are defined. Appendix A1 provides for some relns and their respective definitions, it being noted that this is not an exhaustive list and that additional relns are utilized or can be defined. For relns with percentage weights, the 5-bit scaled unsigned percentage field that constitutes the five Least Significant Bits (LSB) of the Cmd field are used. This leaves a very limited number of command opcodes, limited to 5-6 such relns in total. (Each such reln diminishes the available number of unweighted relns by 32, down from the total of 255 for the non-weighted relns.) Thus, there are only a total of 255 relns max, and both weighted and non-weighted relns allowed for. Of course, by increasing the length of the Cmd field, this can be remedied. It should be understood that the overall length of the reln could be increased to expand the addressing space.

Since only a 5-bit field is used to store the percentage, each count amounts to roughly 3.3%, going from a value of 0% for the bit value of "0" and a value of 100% for a bit value of "31." Unless otherwise specified by the source data creating a linkage, the weight is set to approximately 50% by default. The various Op codes associated with the weighted neurons for one example of the system is set forth in Appendix A1.

Figure 9:
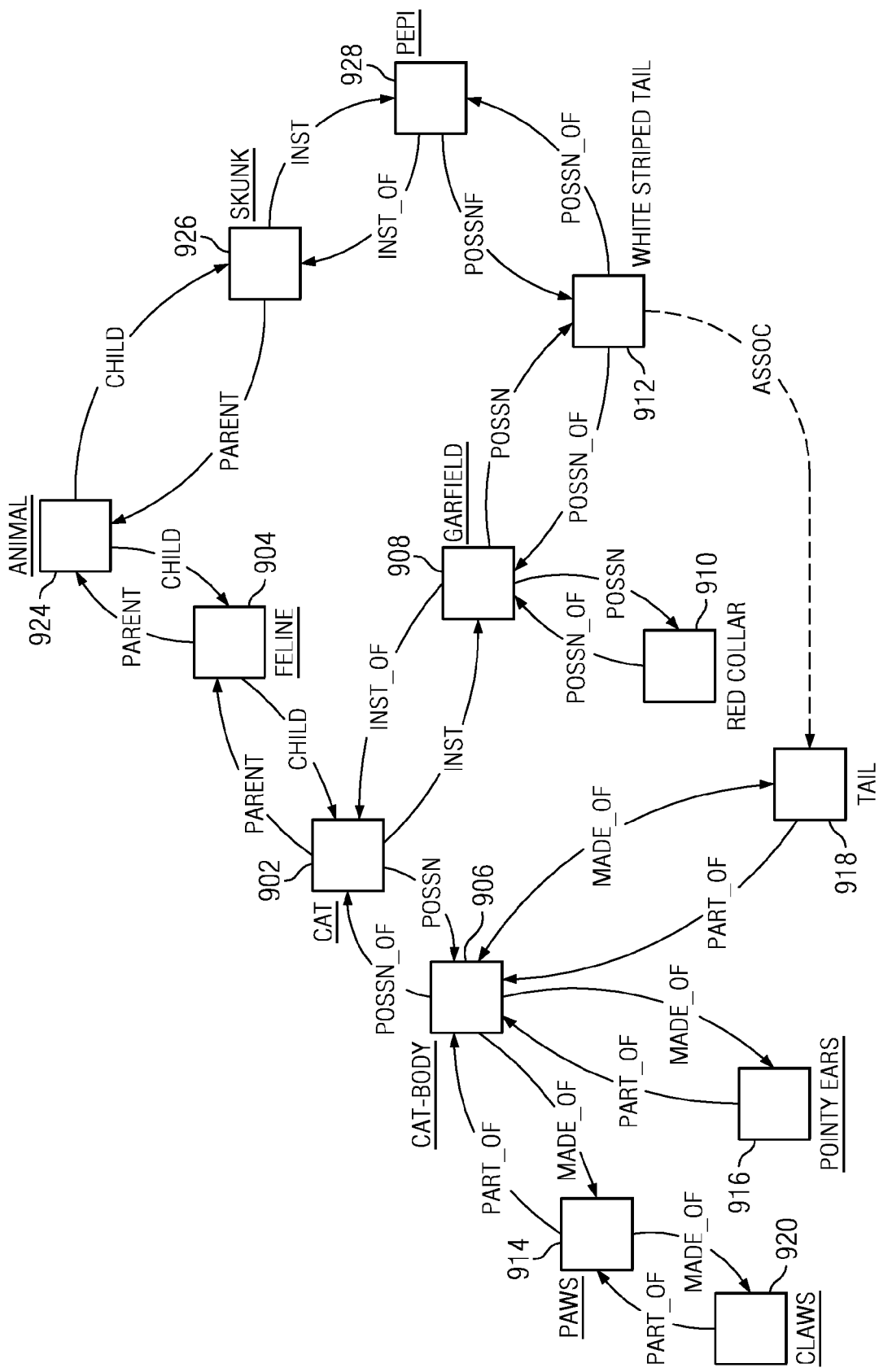
FIGS. 9 and 10 illustrate a diagrammatic views of additional concept flows.

Referring now to FIG. 9, there is illustrated a diagrammatic view of a particular set of relationships between neurons. This represents the state of this particular set of neurons and their relationships at a given time. The relationships have already been created and the neurons are "fixed" for this particular example. As such, this is representative of a static state of the system at a particular moment in time. It should be understood that during receipt of some type of input in the form of a discourse, for example, additional concepts can be introduced or, additional relationships between concepts can be introduced. As noted herein above, for example, there could be a discourse that indicated that a leopard, associated with a particular conceptual neuron, had a leash. If this particular relationship did not previously exist, then a new reln would be stored in the leopard neuron to point to the leash neuron, a previously existing neuron by assumption. At the same time, a back-reln would be created with the POSSN_OF stored in the leash neuron pointing to the leopard neuron. Additionally, it may be that not every leopard, i.e., the basic concept, would have this leash. Therefore, there may be the situation wherein a particular leopard by the name of Egor possessed the leash, which was an instance, INST reln, of the leopard neuron, such that the Egor neuron possessed such and not the leopard neuron.

Returning back to FIG. 9, the relationship associated with a cat neuron 902 will be discussed. The cat neuron has multiple direct relationships, i.e., once removed therefrom. The cat neuron has a parent/child relationship with a Feline neuron 904 such that there is a PARENT reln stored at the Cat neuron 902 pointing to the Feline neuron 904 and a CHILD reln stored at the Feline neuron 904 pointing to the Cat neuron 902. The Cat neuron 902 has a POSSN reln pointing to a Cat Body neuron 906 with a back-reln POSSN_OF pointing back to the Cat neuron 902 from the Cat Body neuron 906. There is also a name that is associated with the Cat neuron, that being "Garfield," which results in a "Garfield" neuron 908 having an INST reln pointing thereto from the "Cat" neuron 902 with a back-reln of INST_OF reln pointing from the Garfield neuron 908 to the Cat neuron 902. The Garfield neuron 908 is merely the concept of a particular instance of which, when looking at the properties, will allow a system to determine the textual word associated therewith. However, the neuron itself is merely the concept of a particular instance of a cat that has associated therewith the various relns and the such. For example, the Garfield neuron 908 has a relationship with an object neuron 910 associated with a red collar, this being Red Collar neuron 910. This is a POSSN reln pointing from the neuron 908 to the neuron 910 with a back-reln POSSN_OF pointing back thereto from the Red Collar neuron 910. Additionally, the Garfield neuron 908 has a relationship with a neuron 912 being a possession relationship such that a POSSN reln exists at neuron 908 pointing to neuron 912. Neuron 912 is that associated with an object, a white striped tail. Thus, this is a White Striped Tail neuron 912. It has a back-reln POSSN_OF to the neuron 908. As such, the Garfield neuron 908 merely provides an instance of the Cat neuron 902 such that a potential query of "What bears the name Garfield?" will result in a search that will fingd the Garfield neuron 908 and allow the back-reln to direct the search to the Cat neuron 902.

The Cat Body neuron 906 has a plurality of constituent parts, these being neurons 914, 916 and 918 associated with paws, pointy ears and a tail, respectively. Each of these has a MADE_OF reln associated therewith, and each of these has a back-reln PART_OF back to the Cat Body neuron 906. In addition, the paws neuron 914 has a MADE_OF reln to a neuron 920 associated with claws, with a back-reln PART_OF to neuron 914.

As cat moves to higher level concepts, the Feline neuron 904, etc., a different higher level hierarchy is reached. However, the relns are not associated with hierarchy. This is merely embedded within the relns themselves. For example, the Feline neuron 904 is related to a higher level neuron, the Animal neuron 924, with a PARENT reln stored at the Feline neuron 904 pointing to the Animal neuron 924 and a CHILD reln stored at the Animal neuron 924 pointing to the Feline neuron 904. Understand that the reln stored at any given neuron defines the type of reln it is and then the NID associated with that reln defines the particular neuron to which it is related in the defined manner.

Additionally, the Animal neuron 924 can have a PARENT/ CHILD relationship with respect to a Skunk neuron 926 (it being noted that there are probably different levels of PARENT/CHILD relationships therebetween but this has been reduced for simplicity purposes). The Skunk neuron 924 has an INST reln to a neuron 928 associated with the name Pepi. This is illustrated to show that neuron 924 also has associated therewith a POSSN relationship with respect to the neuron 912 for the white striped tail. Thus, both the Garfield neuron 908 and the Pepi neuron 928 have a relationship to the same white striped tail. Also illustrated is an ASSOC reln between the white Striped Tail Neuron 912 and the Tail neuron 918. This is a bidirectional neuron showing that there is an association between the two.

Referring further to FIG. 9, it is noted that these relationships, in the static mode, allow one to gain a significant amount of information about a particular concept. For example, suppose that a query were made to this particular nodal array inquiring the following "Tell me about a cat?" and including the search criteria that it include PARENT/CHILD relationships, all instances of the cat and what the cat was made of, at least to one degree. This would return information such as the following "A cat is a member of the feline category and it possesses a cat body. The cat body is made of paws, pointy ears and a tail. One particular cat is that named Garfield." As one can see, this required nothing more than to determine the sequence of concepts centering at the Cat neuron 904 and following the relationships outward therefrom to the other concepts by only a single reln step, i.e., one degree of search.

Figure 10:
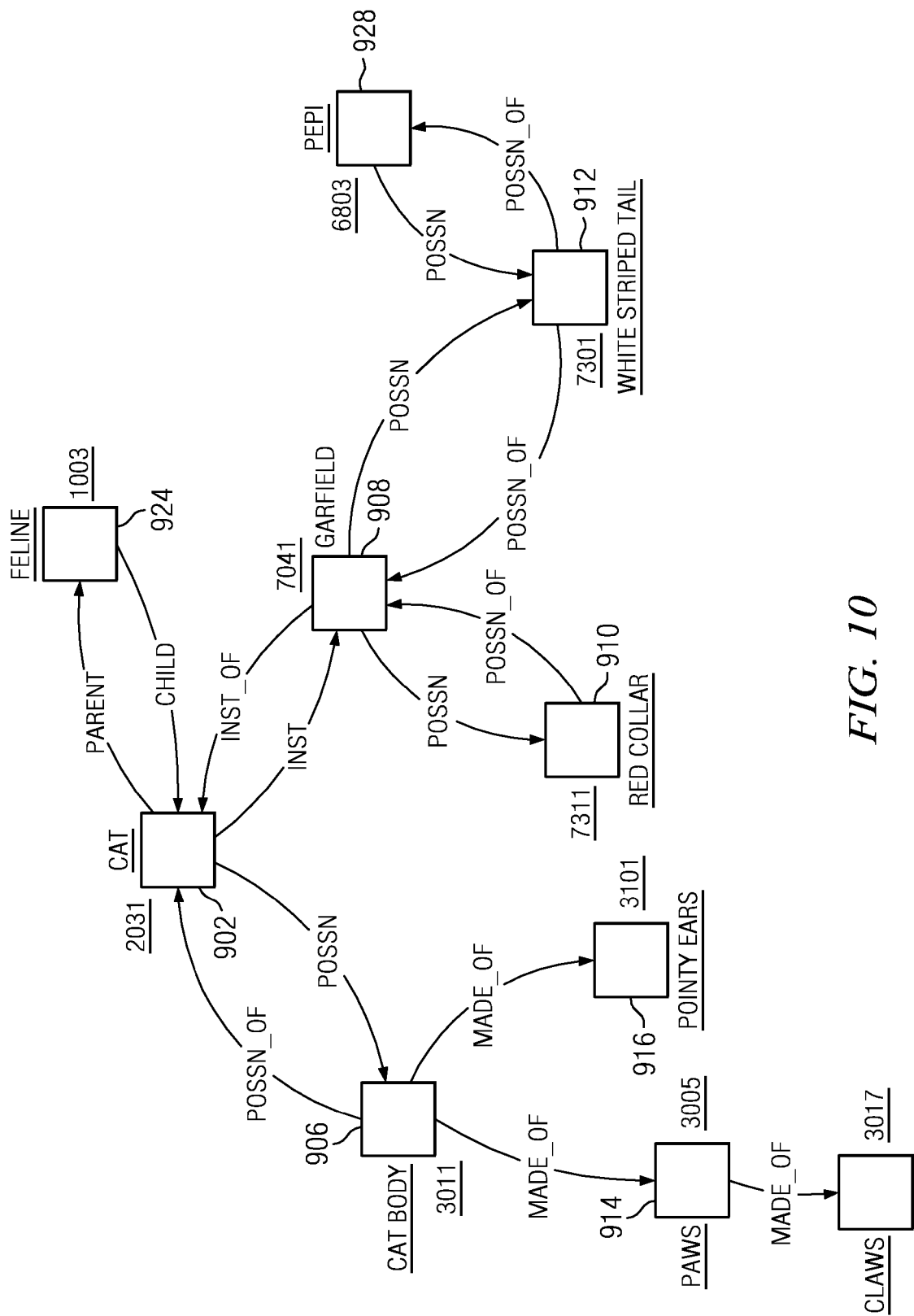

Referring now to FIG. 10, there is illustrated a more simplified diagram illustrating the diagram up to at least the Feline neuron 924. Each of these neurons that are illustrated in FIG. 10, leading out the Skunk neuron 926 and the Pepi neuron 928 in addition to the Tail neuron 918, provide neuron numbers. As illustrated, each neuron number is underscored to distinguish it from a reference numeral. The Cat Body neuron number is "3011," the Cat neuron 902 has an NID "2031" and the Feline neuron 924 has a NID "1003." Therefore, the inquiry would be "Tell me everything about a cat."

This would be translated to the NID "2031." This would then take off with a response "A '2031' is in the category '1003' and possesses a '3011:' The '3011' is made up of a '3005' and a '3101:' There is a '2031' that exists that is named '7041.'" All that is required is to utilize the properties portion of the particular neuron to determine the text associated with that particular neuron to complete the query.

Figure 11:
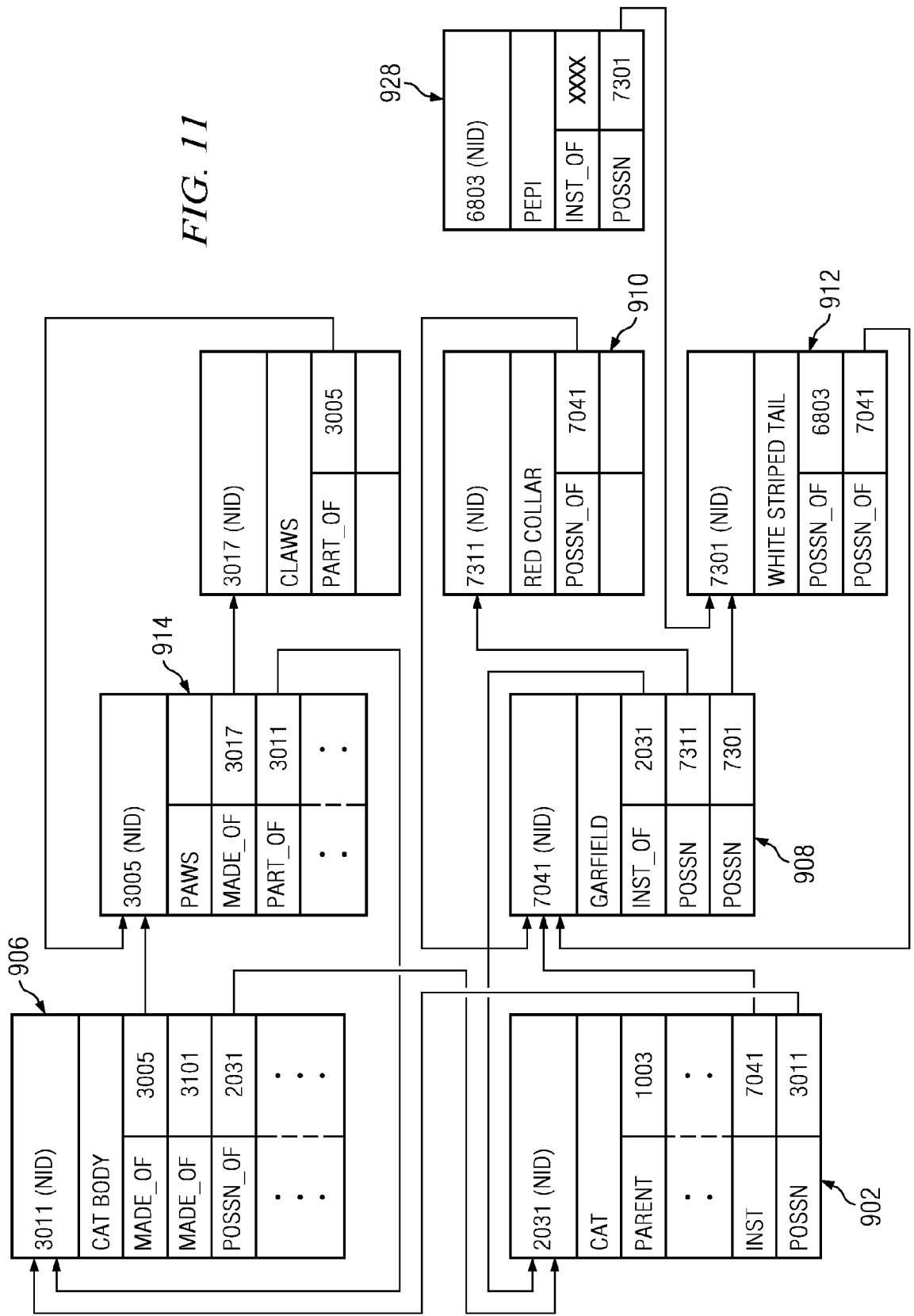
FIG. 11 illustrates an alternate view of the concept flow of FIG. 9 with neurons illustrated.

Referring now to FIG. 11, there is illustrated a diagrammatic view of how the various neurons illustrated in FIG. 10 are related to each other. Each of the concept neurons has associated therewith, as described herein above, an NID. Also associated therewith, in addition to the properties aspect (not shown) are the relns. Each of the relns constitutes the type of reln it is in addition to the NID of the concept neuron to which it points. For example, in the Cat neuron 902, there is assigned an NID of "2031" thereto. This has a POSSN reln associated therewith which points to the neuron "3011" which is the NID of the Cat Body neuron 906. Additionally, the Cat Neuron NID "2031" has associated therewith an INST reln pointing to NID "7041." This is the NID of the Garfield neuron 908. Since there is a back-reln associated with each of these, the Cat Body neuron 906 has a POSSN_OF reln pointing to neuron "2031," the Cat neuron 902. Similarly, the Garfield neuron NID "7041," has an INST_OF reln pointing to "2031," the NID of the Cat neuron 902. Similarly, all of the other neurons have the various relns pointing to different neurons. By looking at the relationships, various queries can be answered. For example, the question might be "What type of animal might have a red collar?" This would merely require the system to go to the neuron 910 and look at the back-reln to go all the way back to a neuron having a PARENT/CHILD relationship that led back to the Animal neuron 924. This will result in the neuron 902. This can quickly be done through the use of the relational interconnections and then merely look up the text associated with the neuron 902 and provide the answer, "This is a cat." Another query could be "What does Garfield possess?" This would merely require going to the neuron 908 and going back to any neuron that would have the closest MADE_OF reln associated therewith. This would come back with the answer that it possessed "a cat body with paws, claws, pointy ears and a tail."

As noted in the index, there are different types of relns. Some are parent-like, some are child-like and some are sibling-like. The parent-like relns are relns such as PARENT, PART_OF, INST_OF and POSSN_OF. This means they point back to a higher hierarchical order. The child-like relns would be those such as CHILD, INST, MADE_OF and ATTRIB. The sibling-like relns would be those such as ASSOC and NAT_ATC.

In another query, suppose there is some issue as to whether Pepi is related to Garfield. This would require the neuron 928 and the neuron 908 to be searched backwards to a common PARENT/CHILD relationship, i.e., it would follow the parent-like link back to a common concept neuron. When it arrived at the common concept neuron, this would constitute the relationship.

The concept of "Clumps" is defined as a neuron that contains a reference to a verb (a requirement) and that takes a plurality of concepts, be it words or phrases of a sentence or otherwise, and converts them to a series of semantic roles. As such, it is capable of capturing the knowledge embodied within an independent clause. With respect to clumps of sentences, this is again geared by the role of those sentences from a semantic standpoint. It should be understood that the term "relational interconnections" when used with concept neurons defines a relationship between one neuron and another neuron. In a similar manner, a "role" is still a relationship between a clump neuron and all of the concept neurons that make up the clump. The role defines the relationship of each of these neurons in the clump or each of the sentences within a clump. To understand the concept of clumps, it is first necessary to determine how clumps are formed and such discussion will follow.

The Predicate Argument Structure (PAS)

Central to any sentence or thought is the main verb. It is the driver of the sentence car. For any given sentence, selecting a different main verb from that sentence can lead to a drastically different meaning. The main verb assigns semantic "roles" or "responsibilities" to the various grammatical constituents, and when that verb changes, the entire sentence changes. The unique verb can occur in a certain manner, at a particular time, it can carry a theme, and there can be a main agent or something that experiences the verb's action. Modifiers such as roles, experiences and locations enable the transfer of words to concepts. The words are not stored-the concept behind the words are.

The PAS consists of multiple different roles that can be assigned to any given verb. An example of these roles are stated as follows:

Agent: "Georgio" painted the actors in the nude.
Experiencer: The dog caught the "Frisbee."
Time: "In the night," the creatures came out to play.
Manner: The chicken "quickly" crossed the road,
Place: I like to eat hot dogs "at the ball park."
Topic: Snakes claim "that Chinese cooks are dangerous."

With the PAS information for verbs, the parser is able to understand the unique relationships that can occur between verbs and the roles associated therewith and the roles or responsibility that they may assign.

The various roles can be assigned at different levels. At the sentence levels, there are applied "sentence roles." These are in addition to the Semantic Roles assigned by the verb. At the sentence level, the Sentence Roles are frequently used to connect thoughts. Correlate pairs, such as "if-then" will establish a unique relationship between sentences. Adverbial conjunctions such as "however" denote contrast to a previous statement. These play a critical role in understanding relationships between thoughts.

Figure 12:
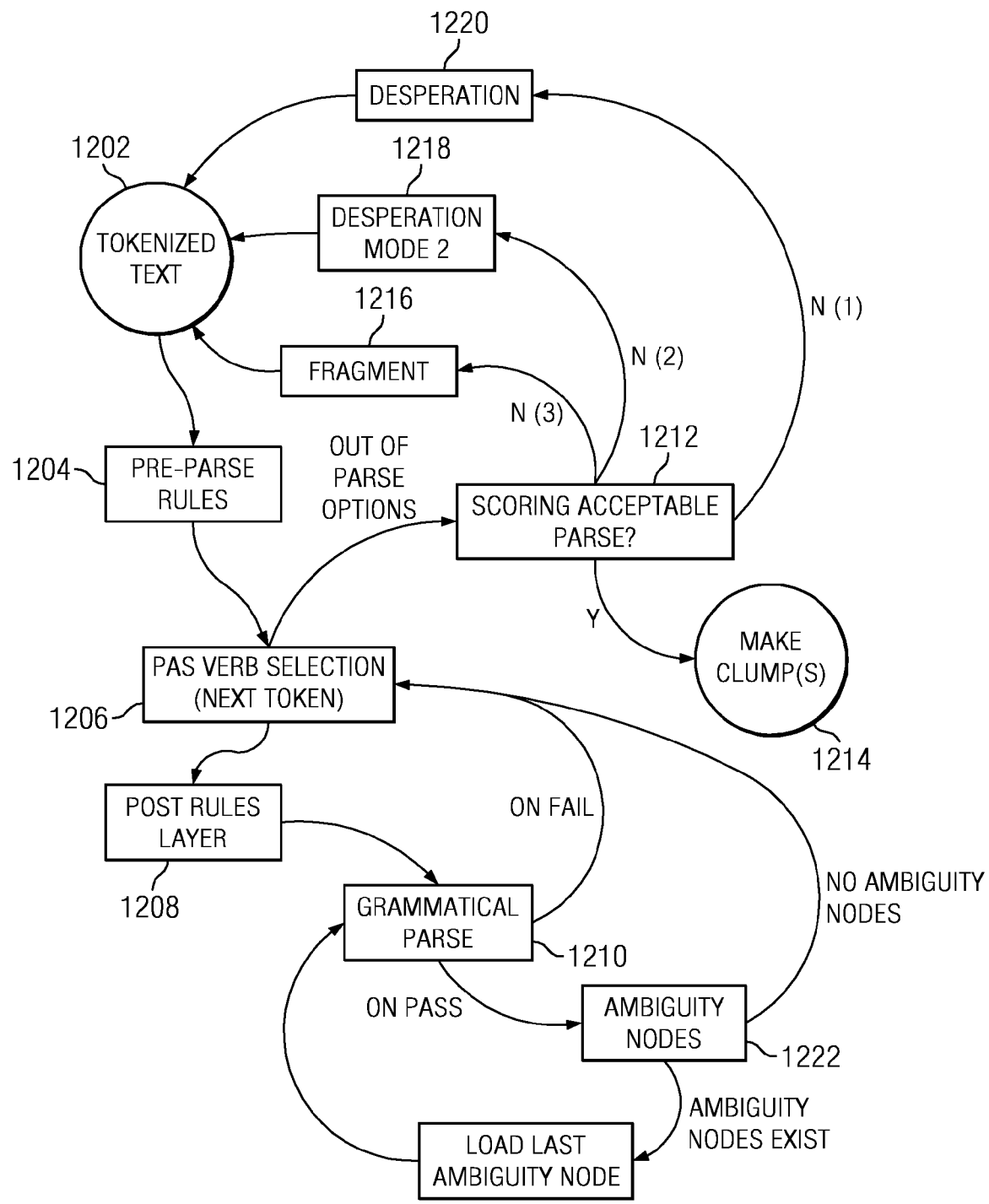
FIG. 12 illustrates a diagrammatic view of the parser.

Referring now to FIG. 12, there is illustrated a diagrammatic view of the process from the tokenized text to the clumps. As noted herein above, the basic flow of the parser involves:

1. Tokenization
2. Pre-Rules Layer
3. PAS Verb Selection
4. Post-Rules Layer
5. Grammatical Parse
6. Rule Resolution
7. Scoring
8. Conceptual 'Clumping'

The tokenization is initiated at a block 1202 to start at the most basic level. The target text must be prepped prior to attempting to parse it. A tokenizing process is applied to break the text into basic groupings. In language, these are often called words, i.e., the logical semantic element. These words do not have to be official words, as they could be an unknown collection of letters or a sequence of symbols. These "tokens" are the input that drives the parsing process. The next step in the process is associated with the Pre-Rules Layer, as indicated by a block 1204. The pre-parsed layer marks all the relevant tokens with flags that clue the later grammatical parser. For each sentence, the Pre-Rules need only be executed or run one time. They are not changed due to different verb attempts, because they hold true no matter what the main verb ends up being. The next step is the PAS Verb Selection at block 1206. The Predicate Argument Structure (PAS), or the main verb, is selected through a scoring system. The scoring system determines which possible verbs to try. Regardless of success, other options will also be selected and tried due to the recursive nature of the parser. For any given parse attempt, the PAS Verb selected is the main verb. Going forward, the parser assumes this to be true and proceeds as if it were so. This enables the parser to avoid the complexities of constantly attempting to resolve the issue during the grammatical parse. The next step is the Post-Rules Layer at block 1208. Post-rules are applied to the input tokens according to the assumed selected PAS Verb. In English, there are rules that can be applied once the verb is discerned. Since the parser assumes the main verb, in any given parse, the main verb has been discerned.

The next step in the process will be the grammatical parse, as represented by block 1210. This is a recursive process. When parsing text, there are many "decisions" that have to be made. Many words can operate at multiple word types. Improper grammar and punctuation is often used, and that cannot prevent the parser from its task. "Decision Nodes" have been implemented that track these decisions much through the course of the parse. An example of a decision node is the following:

The Cops claimed that criminal.

A decision point occurs after the main verb "claimed." The PAS data for the verb "claimed" indicates that "claimed" assigns a role of "theme." This theme represents the verb "claim." As a theme, the entire role itself can be a nested clause with its own PAS verb. At the point "that" is encountered, the grammatical parser cannot be certain if a nesting clause exists, if that is a relative pronoun, if it is an irrelevant keyword, or if that is a determiner. A nested clause is referred to by Linguis as a "CP" or complementizer phrase. Complementizers can have their heads, or words that will lead them off, or they can be assumed. These cases would look as follows:

The cops claimed that: All Relative Pronoun Theme
The cops claimed that criminals are dangerous: Nested Theme CP w/CP head.
The cops claimed that criminal is dangerous: Nested Determined Theme CP w/no CP head.
The cops claimed that criminal: Determined Target A decision node is needed at: "The cops claimed that . . ."

The decision node stores an enumerated set of information regarding the decision. Nodes are coated with the realm of possibility. Decision logic determines which possibility to choose and it records that choice in a log. Some nodes lead to ambiguity, while others do not. Upon failure, or success of any given parse, all ambiguous nodes will be chased. Essentially, the other choices are made and the parser attempts to parse that particular version. In handling decisions in this manner, the parsers hands are clean. There is really no decision because all decisions that leading to a valid parse are valid and acceptable at this stage.

The next step in the process is determining the role resolution. In that role resolution, the grammatical roles are converted to their PAS Role counterparts. A subject may become an actor, an experiencer, etc. The PAS verbs are defined through the use of various rules that are set subject to linguistic guidelines. These roles must then be scored, this scoring viewed as a competition. This is facilitated at a block 1212. The valid grammatical parse options are the competitors vying for the parse. There are multiple layers upon which the competition can be judged, as follows:

1. PAS Layer
2. Role Layer
3. Context Layer

A score is calculated and the players compete. The highest score wins in this instantiation. If there is no viable option, then the decision will fall into a series of desperate modes. These modes change the way the pre-rules work and gradually become less restrictive. A sentence like, "The is my favorite determiner." would parse once certain grammatical restrictions were loosened. The final attempt, if all else fails, is to parse the sentence as a fragment.

Although the grammer+PAS parser has been discussed herein, it should be understood that other parsers could be used. Grammatical parsing could be used, statistical based parsing (i.e., the type typically found in Google® type systems) could be used, or just the basic PAS parser could be used.

Conceptual Clumps, as described herein above, are a collection of concepts, wherein words are used to convey concepts. This collection of concepts is a collection that come together to form a thought. The output of the parser is a single clump at a block 1214 that is neatly stored in its conceptual form. During the scoring operation, either a fragment is returned, a desperation attempt is taken, etc. This is illustrated by blocks 1216, 1218 and 1220, each taking a separate path back to the initial tokenized block 1202 to pass through the process one additional time.

During the grammatical parse operation, there can be ambiguities, as well as at the verb selection. This ambiguity is resolved at an ambiguity node 1222. If the grammatical parse has been acceptable, it will pass to the ambiguity node 1222. Once any ambiguities are cured, this will pass back to the PAS Verb selection block 1206 and then to the scoring block 1212. The ambiguity nodes block 1222 determines if there are ambiguities and, if so, it will pass as to the last ambiguity node and then back to the grammatical parse. If the grammatical parse fails, it will pass back to the PAS Verb selection block also. With respect to ambiguities, there are two major types of ambiguity: lexical and structural. Lexical ambiguity occurs when one word can mean different things. Technically, the homograph head can be interpreted differently. Words like bank, jump, chair, or cup all have multiple meanings and uses. An example of such is, "American chair seeks arms." There are actually two lexical ambiguities here. The first, i.e., is "chair" of the American variety or is "chair" of something that is American, e.g., leader, head-of-state? The other ambiguity is are these "arms" parts of a body or parts of a chair? In general, lexical ambiguities arise when words can function as two or more parts of speech. By comparison, structural ambiguity occurs when a phrase owner can be misapplied, such as in the phrase "He painted the actors in the nude." The question would be as to whether the man was painting while nude or were the actors he painted nude. Generally, context can resolve structural ambiguity. Was the man known for painting nudes? Was he known to be an eccentric or radical artist? Is this statement being tied to another that may help ones understanding?

Various ambiguous combinations, bad punctuation, complex sentences and unknown words can lead to a wide variety of grammatical parses. For example, in the phrase "Chocko recognized Zools fly in the night." There may be as many as fifteen different meanings that the sentence could have. For example, it could be "in the night, Chocko 'recognized' a certain type of fly." or "Chocko 'recognized' Zools [that] fly. (flying Zools)."

As noted herein above, the clump basically gathers information about an action that took place and garners with all the history of that event. Such clumps are repositories for the actions taken by nouns and each such clump implies what can be viewed as the content of an independent clause, with a variant handling dependent clauses. Thus, a Conceptual Clump stores the parsed "thought," And is generally used to hold the verb of the sentence, although it need not be. For convenience, clump neurons have their own number and space, as noted herein above.

At the basic level, the clump takes the words and phrases of the sentence and converts them to a series of semantic "roles." Three types of semantic roles drive the basic sentence clump. The primary is the PAS Verb (ROLE_CLUMP_VERB). It is the main verb that assigns most of the other roles stored in the clump. It is important to note that different PAS verbs will assign different roles. Some verbs are not able to assign certain roles, and many times the roles that are assigned are restricted in various ways. These restrictions provide an aid in scoring a parse, as they will help an accurate sentence reconstruction. In addition to the main verb is the ROLE_TASPECT. It contains the tense and aspect that the PAS assigning verb utilized.

The last driving role at the basic sentence level is captured with one or more of the five modal roles: ROLE_M_INTENT, ROLE_M_ABILITY, ROLE_M_OBLIGATION, ROLE_M_DESIRE and ROLE_M_POSSIBILITY.

Figures 12A, 13:
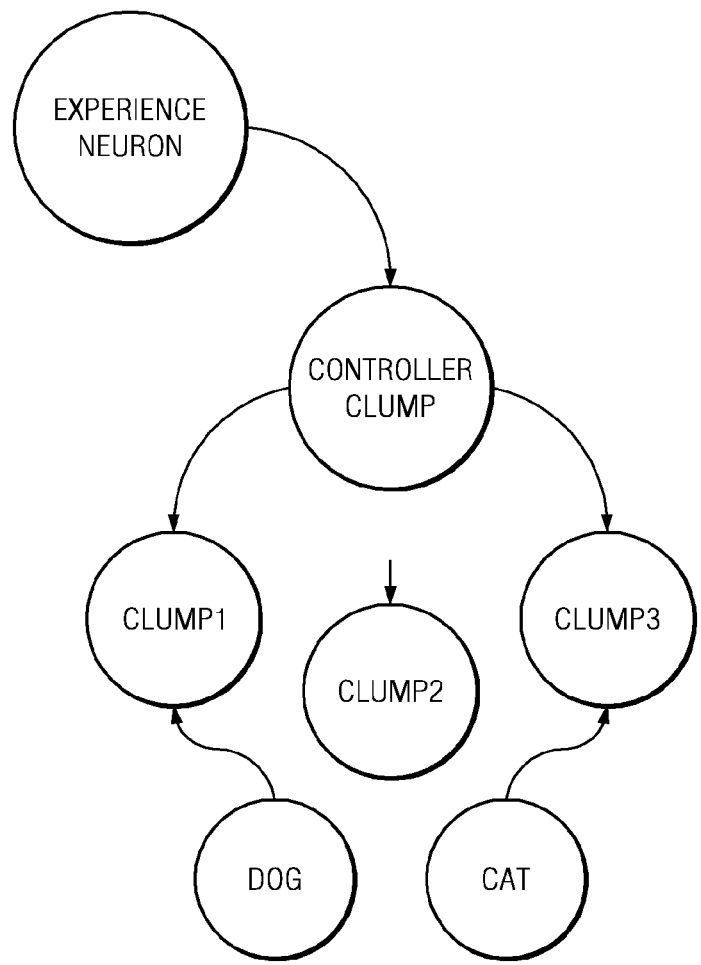

With these three roles, POSS, TASPECT, MODAL, it is possible to reconstruct the verb, the tense, the aspect and the modality. Something like, "Wanted to be jumping" could be captured with relns. The full sentence, "The rabbit may quickly jump over the carrot," breaks down into Clump 2001 as illustrated in FIG. 13. In this clump, it can be seen that there are a plurality of roles that are associated with a resolved neuron ID (NID). For example, the role, ROLE_CLUMP_VERB, is resolved to be associated with the "jump" NID. The role, ROLE_TASPECT, is resolved to be associated with the PRES NID. There is provided a role, ROLE_M_POSSIBILITY, that is associated with the "may" NID, a role, ROLE_ACTOR, associated with "the rabbit" NID, a role, ROLE_EXPERIENCER_, associated with "the carrot" NID, and a role, ROLE_NANOR, associated with the concept "quickly" NID. There is also provided a command field that is a 2-bit field located in every role of the clump. Its primary purpose is to allow reusability of clumps. Were clumps to proliferate, they would consume significant memory space over time. To mitigate this, a method is implemented to permit reuse of existing clumps, such as sharing a clump that is close to what is needed. A base clump can be shared as a result to save storage space if a new clump is only different by "n" amount of roles (where "n" is determined by a function that decides if it actually saves any time/space through reuse of the clump). An alternative to this, and possibly a preferable one, is to minimize creation of these extra clumps, using linked list structures to hold the would-be content of the clumps. The worth of each such (tree-like) structure branch would then be evaluated to determine which one should be selected to be output as a clump neuron.

As noted herein above numerous times, a single neuron represents a single concept, and connections to other neurons establish its meaning, representation and purpose within the context of the entire database. The clumps, on the other hand, utilize "semantic roles" to capture the history of some aspects of the concept within the brain. Establishing these semantic roles for nouns and verbs allows the system to more easily restate things. The allocation of roles (and rules for their use) to words are used as an existing hierarchy of words. With or without them, the system can choose alternative word-rendering or the same concept, but roles make that choice easier.

The semantic roles thus act as a "glue" that takes the meaning implied by an existing neuron interconnection—with or without hierarchy—and guides their transformation into sentences where needed. Before proceeding further, it may be helpful to describe the general concept of semantic roles in terms of the PAS.

The PAS Semantic Roles

In general, all nouns in a sentence are considered to be arguments to a verb wherein each verb assigns one label, called a semantic role, to each noun. The total of semantic roles for a particular verb is the Predicate Argument Structure, or PAS for that verb. Again, note that PAS is just one of multiple parsers that could be utilized herein and it is anticipated that other parsers could be utilized.

In general, the goal of this system is to separate the semantics, or meaning, from the syntax, or form (such as word order). This system is designed to handle the various ways that one can change word order or even tense in English, but retain the same meaning. There are provided three examples of this word-order change. They are as follows:

Active vs. Passive Sentences:
The sentences "I ate the cookie" and "The cookie was eaten by me" mean the same thing. Both of them have the eatee and the eater, but the word order is different. The PAS model tags the eater as the Agent, and the eatee as the Experiencer, regardless of the order of the words.

Ditransitive or VG verbs.
Ditransitive verbs are verbs such as "give" which can take to objective, as in "Moses gave 'Miriam a cookie.'" All ditransitive verbs may also be used as a regular transitive verb, with an additional prepositional phrase, as in "Moses gave 'the cookie to Miriam.'" In both forms, however, Miriam is still the person who has the cookie at the end, Moses is still the person who gave it to her, and the cookie is still the thing that was given.
There is also under the usage of the ditransitive, and though it may be handled the same way in practice, it is for the special enumeration. In some dialects only, words which are normally not ditransitive may become so in order to denote the beneficiary. For instance, "I'm going to paint 'me a fence,'" or "I'm going to kill 'me a bear.'" The final form, called the attributive ditransitive usage, occurs only in verbs which attribute one object with another object or with a quality. For instance, "You shall call 'his name John.'" or "Let me make 'you a nice supper.'" or "Octavia will call 'Isabel a cab.'" This can be confusing at times-will Octavia now refer to Isabel as a cab, or is Octavia calling a cab for Isabel's benefit?

Ergative Verbs
Ergative verbs behave differently if they are used transitively or intransitively. If they are used intransitively, they then mean that the action was done to the subject. However, if they are used transitively, then they mean that the action was done "by" the subject to the direct object. Examples of this are the sentence "The alien ray gun liquefied the green chair." and "The green chair liquefied." For example, in both of these sentences, "The alien ray gun liquefied the green chair" and "The green chair liquefied," the same object was liquefied-the green chair-even though it was the object in the first sentence and the subject in the second. It is worth noting that the second sentence is not passive of the first. The passive would be "The green chair was liquefied by the alien ray gun."

There are three categories of roles provided, Universal Roles, Regular Role, and Specially-Assigned Roles. These are defined wherein Universal Roles are roles that may be used in any sentence no matter what the verb type. Regular Roles are roles that must be assigned by the verb; they may not appear in just any sentence, and Specially-Assigned Roles are those roles that may only be assigned by certain kinds of verbs. These roles are defined in Appendix B.

Returning to the clump definitions, in addition to the simple clump described in FIG. 13, there are also provided Nested Sentence Clumps. These are slightly more complex than a basic clump in that this type of clump contains a nested clump functioning as an entire role assigned by the PAS verb sentences with relative adjectives (Radjs), nested WH roles, and gerunds are examples of this. For example, the sentence, "The rabbit that bit me may quickly jump over the carrot." FIG. 14 illustrates clump "2001" referring to clump "2002" in the role, ROLE_ACTOR. This shows the additional role, ROLE_CLUMP_VERB, as being associated with the word "bit" and the role, ROLE_EXP, as being associated with the word "me." Sometimes, however, relative adjectives (Radj) will not need to be stored as nested clumps, even though that is how they will grammatically parse. A Radj is used to determine the noun. It is helpful to resolve a noun by determining "which one" one is considering. However, if the clump Radj forms is new information, it should be stored. The system will either resolve a noun or it will have to create a new concept that awaits resolution with a high priority flag.

Conjoined Sentence Controller Clumps

The flow of thought usually ties sentences together with conjunctions, or through punctuation functioning as conjunctions (assumed conjunctions). These are at the sentence level and are used to coordinate, subordinate, or establish a condition (if/then). An explicit example of this is "Luke wanted peanuts, however he got cashews." An assumed example of this is "Luke wanted peanuts. He got cashews." One could choose to make two standard clumps and store a forward sentence role from one and a back link to the other, but that might be considered restrictive. There are various forms the two thoughts could come through, and if the system is allowed to pick any particular one to standardize on it might run into complexity issues that the system should not have to deal with (i.e., "Luke got peanuts but he wanted cashews.").

A more accurate way to store the information is with a Controller Clump at a higher level, as described herein above. The assumption of the controller is that it progresses linearly, i.e., it is a linear flow of concepts. Connected clumps are stored in a linear fashion. If one is not explicitly expressed, the system will store them in a logical progression (i.e., Want, then, Realization, Expectation, then Reality). The controller is the essence of the connected thoughts and this is illustrated in FIG. 15.

In FIG. 15, the clump "2001" is defined as the Controller Clump. This has two roles, the SENT_SEQ role and the SENT_CONTRAST role. The first role is assigned or points to the resolved NID of clump "2002," and the second points to the resolved NID of clump "2003." Clump "2002" has a plurality of roles associated therewith. This is for the words "want," "Luke," and "peanuts." The verb "want" is the main verb for this clump and occupies the role, ROLE_CLUMP_VERB. The word "Luke" takes the role of the actor and the word "peanuts" takes the role of the experiencer. The owner is the Controller Clump, clump "2001." The clump "2003" is associated with the words "got," "Luke," and "cashews." The main verb in this clump is the verb "got," the actor is the word "Luke," and the experiencer is the word "cashews." The owner, again, is clump "2001." With this arrangement, storing at the higher level will allow for a greater diversity of expression on the output side and also for a strong ability to match concepts in the analyzing process (such as for answering questions).

Referring now to FIG. 12a, an exemplary flow diagram illustrating linking between clumps is shown. The system has various types of neurons of which Experience neurons and normal neurons link to clumps. As to "Experience neurons," all other neurons capture knowledge, relationships and facts, but the Experience neuron captures the emotions, timing and expectations of an experience. In this way, this neuron defines the essential concept of an experience. For convenience, the neuron IDs for experiences have their own numbering space. As such, Experience neurons capture a further level of detail and nuance that comes with first person experience. The core of an experience is a clump, thus it will be linking to clumps. All normal neurons are representative of a "concept" and from these concepts, there is linkage to groupings of concepts (the clump). "A dog that jumped a road, ate a bird and then went to sleep," links to a controlling clump representing the entire sequence.

Each concept that played a role will have a link to the clump they played a role in. The bird clump can get back to the cause of its clump by going to the controller clump. A "conceptualizer" logic decides what to do with the clump. It may need to be broken down and stored as class level properties, if or even a process neuron.

Emotional impact of any clump can be stored by adding a ROLE_EMOT reln in the clump. For example, a particular statement of a particular political speech may have incited anger, and that could be stored in the exact offensive sentence level clump. However, the speech itself may not have been offensive, thus the "political speech" clump would not get the ROLE_EMOT.

Another asset is the ability of Experience neurons to point to clumps. If the experience of getting angry met the criteria, it may get its own Experience neuron ('exper'). In this case we would link the exper to the clump and have the option of storing an EXPER_EMOT in the experience.

In the end, clumps are a collection of concepts/thoughts, and by interconnecting thoughts with neurons and assigning emotional impact to them we increase flexibility of the system and we are one step closer to emulating the human brain.

Outline Clump

The Outline Clump (OC) is much like the table of contents for a book. It gives the overall purpose or subject of a discussion and provides a Table-of-Contents-like layout of the material. A single OC, for example, summarizes the contents of a training document the brain has absorbed. Another might outline a movie or an experience such as my "Hawaiian Vacation of 1999".

The OC is a holding place for a series of Controller Clumps (CCs) arranged in a hierarchical fashion. At the lowest level, sentences are comprised of Semantic Clumps (SCs). Each paragraph, for example, is managed by a Controller Clump that includes a number of SCs and a final summary SC. If one is dealing with a book they are reading, higher-level CCs are arranged to account for sections of a chapter. Above them, an Outline Clump (OC) orders the chapter CCs into an overall book. It is possible to discard all the lower-level semantic clumps (SCs) except for the summary clumps, if desired, to provide a synopsis of the book. Each CC and OC has a summary clump attached to it, regardless of the level in the structure. For example, a "section" CC has below it a summary SC for every paragraph. The section itself has a summary SC that is a "roll-up" of the SCs for all the paragraphs below it. Finally, the Outline Clump (OC) has a summary SC that summarizes what the book itself is about.

The OC differs from other types of clumps in that it can wrap up both textual or discussion content as well as experiences (the "expers", as discussed hereinabove). The types of knowledge in an Experience neuron is organized quite differently from clumps and conceptual neurons. It includes such things as expectations and anticipations (met or not) and various emotional and time stamps that relate to the experience. The OC has the least information of all clumps but contains the highest-level synopses of multiple types of knowledge. It is truly an outline or staging point from which to recall knowledge from many levels.

Clump Management

The use (and reuse) of clump neurons must be explicitly managed. A proposed new clump neuron may be similar to an existing clump neuron ("clump"). It may be shorter to create a MAKE_FROM neuron using the original clump as a pattern or template, rather than creating the full clump that largely replicates an existing item. The process for creating a non-duplicate clump takes the following steps:
1. Look for matches.
2. If no match, create a new clump.
3. If there is an exact match, return to clump ID of the matched neuron.
4. If there is a close but non-perfect match, use an existing clump as a make-from template.

In this way, the system maximizes the use of its memory resources.

When creating new clumps, it is necessary for the system to first determine if a similar one exists. The various degrees of matching of the proposed new clump and an existing clump are possible. A "matched" clump is one that has an identical role table set. That is, all of the roles are the same, and the role values are the same (the neuron IDs the roles point to). Alternatively, a partial match can exist wherein some roles match up exactly, but others do not. The system must then determine what threshold will create a new clump vs. reusing an existing one. As an example, consider the phrases "The rabbit bit Thomas," "The rabbit bit Luke," and "Skip bit the rabbit." This is illustrated in FIG. 16. This defines the first sentence with the verb being "bit," the actor being "the rabbit," and the experiencer being "Thomas." This is a newly created clump "2002." When the system encounters the next sentence, it is necessary to decide what the next step requires. A function needs to determine that a very similar clump to this exists. The output of the decision would be to use clump "2002" as a starting point (since it is similar) (only off by one role)). This is accomplished by setting a new clump's class integer MAKE_FROM to the value of the old clump, clump "2002." This would retain all the information therein and in a new table associated with the new clump, the system would only specify the change with the replace command. This would be as set forth in FIG. 17. This response to the command-MAKE_FROM="2002." This essentially replaces "Thomas" with "Luke" as the experiencer. This would instruct the clump merely to replace the experiencer role with a new experiencer role. On the output side, the tool that looked at clumps would see the clump table in FIG. 18 wherein the role of the verb, the actor and the experiencer were replaced or grabbed from the template. As such, these are not actually stored in the new clump, but just appear to be in the clump. It is noted that the command line for the "Luke" word as the experiencer has the information, ROLE_REPLACE, associated therewith.

In the example of a non-marking clump, consider the phrase "Skip bit the rabbit" wherein only a single match exists, and that is on the verb. The other two roles do not match. For such non-matching clumps where there are more differences than matches, a new clump is created for the proposed clump.

Frame Semantics

Frame semantics is generally the study of how meaning is understood in the English language in terms of frames, wherein a frame can be understood as a "framework of concepts" that surround a particular word, which concepts are required for that word to be understood. In the presently disclosed embodiment, the verb is the word around which concepts are defined in the concept of a framework of concepts. Thus, a verb frame is a frame that consists of basic elements, which are called "frame elements" of the verb concept and the relations between those frame elements.

These frame elements are concepts that are intimately involved in any action, but these elements are not the action itself. For example, the verb "to give" cannot be understood without the concept of a giver, a receiver and a gift, as well as other frame elements. Without the giver, no one could perform the action. Giving would not occur at all. A gift given by a giver to no one is not given at all. Without a gift, nothing can be given. The presence of these elements is necessary for the full concept of giving to be understood. Thus, the frame of a verb is therefore defined by the entirety of the frame elements and the relationships of those elements to one another through the verb. To continue with the example of "give," the giver is defined as "one who gives the gift to the recipient." The gift is "the thing given by the giver to the recipient." The recipient is "the one who is given the gift by the giver." By using frames, a great deal of semantic information related to the verbs can be captured and utilized.

In general, specific activities are represented in frames, rather than "situation types." The concepts that are specific to each activity are represented by the frame elements. The frame element is predicted by the activity word, this being the "verb." Thus, for each verb, there will be a prediction in the frame elements that relates thereto. The frame elements capture concepts that remain constant even when different perspectives of a similar activity are being represented by the language. For example, when frame elements are used in conjunction with semantic roles, described hereinabove, the brain is able to understand that a "buyer" is an actor when the "buy" verb is used, but that it remains a "buyer" even when the "actor" position is taken by a "seller" when the "sells" verb is used to describe the same situation. Thus, both the "buy" verb and the "sell" verb would point to the same frame.

In general, as will be described, the overall brain will first parse the verb definitions and then it will create and utilize the frame elements.

Semantic Roles in Frame Elements

Figure 19:
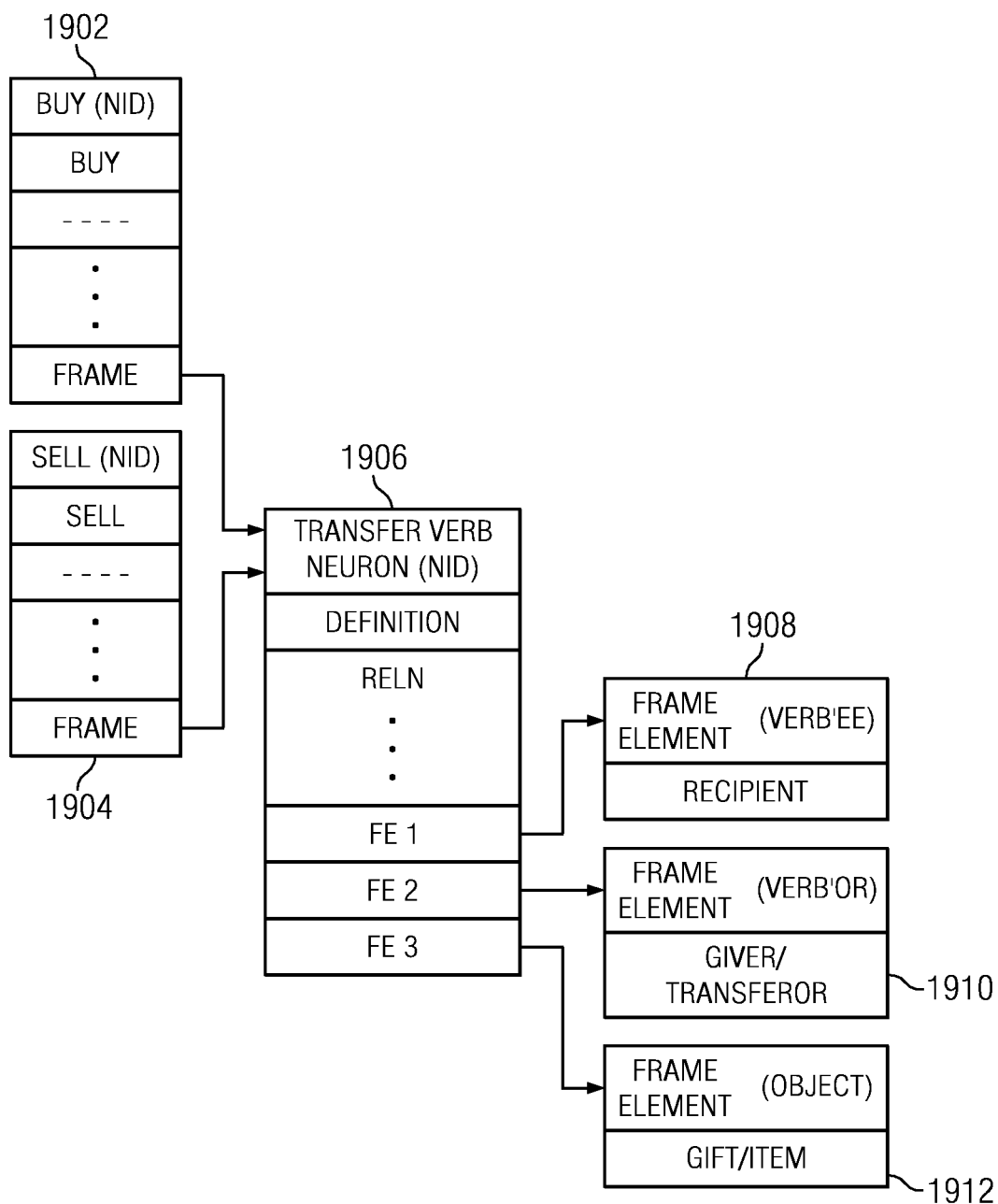
FIG. 19 is a diagrammatic view of frame semantics.

Each verb has a set of semantic roles, which are utilized to determine a phrase's relationship to a verb as expressed in any sentence that the brain is reading. For example, take the situation as follows: a semantic role tells the brain that Bill is an actor in the sentence, "Bill bought a puppy from John." The frame element tells the neuric brain that Bill is a buyer. In another sentence describing the same situation, "John sold Bill a puppy," the semantic role tells the brain that the actor is John. The frame element tells the brain that he is a seller. This is illustrated in FIG. 19. In FIG. 19, each of these concepts is stored in a neuron. There will be a verb neuron, which exists for the verb "buy" represented by a neuron 1902. Similarly, a neuron 1904 represents the "sell" verb. As described hereinabove, each of these verbs will have a plurality of relationships (Reln) associated therewith. One of these will be the frame concept, i.e., it will point to the frame neuron. In this case, it is a neuron 1904, which represents the fact that each of these verbs is a transitive verb and refers to a transfer concept. This will have a field for the definition and a plurality of relationships associated therewith. A number of these relationships will be the frame elements. Each frame element will be fixed with respect to this particular transitive verb concept, i.e., the transfer neuron 1906, and they will be, at the minimum, three frame element neurons 1908 for the recipient frame element, a neuron 1910 for the giver/transferor frame element and neuron 1912 for the object of the transfer transaction. In general, there will be, for a transitive verb, a verb-ee and a verb-er. This will be the person that is the object or recipient of the action and there will be a verb-er that will be the instigator of the action. For this transitive verb, there will also be an object. One cannot transfer from one person to nothing. It has to transfer to something. Therefore, there will be an object of the activity or the transfer operation. For these three elements, there will be fixed with respect to a transfer operation a recipient, a giver/transferor and a gift or item.

When utilizing the semantic roles, it is possible to tell that different perspectives on a particular transaction, this transfer action, are being expressed. This is due to the fact that in one sentence, one of the entities is the actor, and in the other sentence, the other entity is the actor. In the sentence with the verb "buy," the person buying the object is the actor. In the "sell" transaction, the recipient is the actor. However, in each of these, there will be a recipient and a giver and there will also be a common object. Thus, the frame elements remain the same for each of the entities. Bill always remains the buyer and John always the seller. This set of semantic roles for each verb, as described hereinabove, is defined by the PAS "Predicate Argument Structure."

Frame Creation

Frames and frame elements are created with the intent of capturing concepts in neurons. For each verb that is incorporated into the system, a set of unique frame elements are created and contribute to the recognition of concepts. The frame elements are accessed in conjunction with a matrix of information formed by categorical relationships, a hierarchy, semantic roles and definitions in order to understand the English language.

In creating a neuron, again, the example of the transitive action verb will be utilized wherein the person/thing doing the action and the person/thing to whom the action is done will be the type of verb that is described. For example, with the action "to license" there must be a licensor and a licensee. This concept is used in the limitation of the frames.

The terms verb-er and verb-ee represent the frame element neurons that are created to define the concepts of the entities that fill the subjects and object's slots of transitive verbs during the creation thereof. The verb-er frame element stands for the entity accomplishing the action of the verb; whereas the verb-ee frame element stands for the entity to whom the action is being done. Each of these frame element blocks will have a definition block associated therewith, i.e., a relationship to a definition. However, a particular neuron associated with a frame element may or may not have an English word associated with it. If it does, there will be a word pointer (Wp) associated therewith. Frame elements predicted by the verb are normally stored with no Wp and can utilize clump neurons in the definition block to basically capture the meaning. However, in some situations, there may be a word pointer to an English word. For example, a frame element for "one who is harmed" for the verb "harm" is the word "victim." Thus, there will be a relationship between the frame element "one who is harmed" to the neuron associated with the word "victim." However, for most frame elements, the definition block is all that will be provided which can refer to a clump neuron.

During the parsing operation, the tokenizer determines whether it sees a verb-er or a verb-ee. When a verb-er or a verb-ee is recognized, a temporary neuron can be created that shows a relationship between that word and the verb ending of -er or -ee. The conceptualizer will then handle the firing neuron. Therefore, for the sentence "Bill buys a puppy from John," the tokenizer will recognize that Bill is a buyer and will associate Bill with a verb-er frame element. Alternatively, the tokenizer could immediately retrieve/generate the "one who..." neuron for each verb split of the parsed verb. Again, if the verb is in the sentence "Bill buys a puppy from John," then the "one who buys or one who receives" neuron is retrieved.

In general, the tokenizer can recognize the neuron as a first need to look for merely for the "_ who verb" nouns such as "one who buys." It can then decide which one is the actual frame element, i.e., between "thing that is damaged" and "person who is damaged," and "tables that are damaged." There could be a back Reln that points to the particular verb that identifies this as a frame element. In general, once it is recognized as a frame element, it is flagged in some way such that it can be identified as to which one is the verb-er or the verb-ee neuron and then the overall clump can be flagged as having associated therewith a framework. In order to retrieve a particular neuron, the verb neuron is examined and then the Relns are utilized to find the correct nouns that are associated with the framework. Of course, if it does not exist, then the framework must be created. This is facilitated by determining if the verb-er, i.e., the "harm-er," is defined as "the one who harms," and the verb-ee or "harm-ee" is the "one who is harmed." The "harm-er" and the "harm-ee" could have the same clump such that the "harm-er" is the "one who harms a harm-ee."

In order to define a verb, it is defined as having two main components. These are the technical and the text-based components. The technical (e.g., grammatical) information is read in at initiation of the system from a specially formatted file. It includes such matters as transitivity, required an optional semantic roles and restrictions of the semantic roles for each verb. Textual verb definitions are human-readable English descriptions of the word. They are parsed as ordinary English text by the parser, and then used to create the frame elements discussed hereinabove.

In order to define the verb "harm," it is defined as "to harm is to damage a person." This verb "harm" will be described in this system as having transitivity flags and also having a PAS. The frame elements for this particular verb can result in a large number of frame elements. For example, every role in the PAS associated with a particular verb such as "harm" should get a frame element. However, rather than describe each possible role associated with the verb "harm," it is possible to generate frame elements only when they occur such that they would have a newly created neuron. As an example, one or more frame elements could be nested inside a sub clause. One example would be "to damage is to cause [to experience bad effects]." Where "[to experience bad effects]" is the effect of "cause." It is possible to automatically generate the frame elements after the verb definition, i.e., when someone uses them. The exception to this could be the situation wherein "harm-ee" is defined as "victim," and vice versa. For example, "a harm-er harms a victim or any harm-ee is a victim" or "a harm-ee is called a victim" or "one who is harmed is called a victim" or "anyone who is harmed is called a victim." A second option is to automatically generate the frame elements when the system attempts to use one of the frame elements, i.e., "a harm-er" is a phrase utilized in a sentence, or the sentence contains the phrase "one who is harmed." Another option is to explicitly generate everything. For example, "a giver gives a gift to a recipient" is one phrase. This represents a clump, which is defined with the verb and three nouns. This clump is embedded within the definition block of the particular framework. A second way is to explicitly generate everything with respect to the phrase "someone gives something to someone" wherein a sub-neuron can be created for each, with the clump neuron for the entire phrase being related to the definition block. This could, of course, also be the case with respect to the phrase "something gives something to something."Alternatively, the phrase "a giver gives a gift to someone" would be an explicit example wherein this would use the verb-er and the verb-ee for the subject an object.

It will be appreciated by those skilled in the art having the benefit of this disclosure that this method and apparatus for defining an artificial brain via a plurality of concept nodes connected together through predetermined relationships provides an artificial brain that arranges a plurality of concepts in individual nodes of a nodal array for the purpose of allowing them to have interconnecting relationships that can be used to define a concept flow. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

APPENDIX A1

Non-Weighted Relns

Non-weighted relns are listed below. The entire 8-bit Cmd field is used in the enumeration. The enumeration value itself is not given because it changes from time to time.

| Reln Cmd Code | Usage | Usage of 24 LSBs |
|---|---|---|
| R_ASSOC | Association | NID is a neuron associated with this one.. For example, the mud neuron may have an R_ASSOC pointing to earth, and earth has an identical one pointing back to mud. This reln is fully symmetric. It acts as an alternative to actively-firing neurons. See R_SPLIT for further information and usage. |
| R_BLOCK | Gamut (or other list) follows as a block of relns | This reln indicates that a block of data will follow that is to be processed or ignored as a whole. (This replaces the former R_GAMUT reln.) The bits 0 . . . 7 are # elements; bits 8 . . . 15 are block type. For example, the irregular verbs have a present tense, past tense and past participle tense, and the three are laid out as 3 elements of a block of type R_IRR. Each has an R_IRR reln pointing back to the present-tense form. |
| R_CAT | Category or grouping | NID is the category name. Example, bird may have 3 R_CATs, one each to flying, non-flying and predatory. Each of these categories is a complex derived from the name, and can have attributes associated with it. The back-reln of R_CAT_OF points from flying back to bird, allowing bidirectional associations. |
| R_CAT_MEMB | Member of a category | NID is child-member of the category, e.g., human is a member of the biped category. The NID of an R_CAT_MEMB inside biped points to human, which itself has an R_CAT_MEMB_OF pointing back to biped. |
| R_CAT_MEMB_OF | Parental category | NID is parent-like category I'm member of. See R_CAT_MEMB for an example. |
| R_CAT_OF | Back-reln to R_CAT | NID is the item I'm a category of, e.g., biped has an R_CAT to animal, and animal has an R_CAT_OF back to biped. |
| R_CDX_NOUN | Back Reln for Complex | NID is peanut of peanut butter. Normally, an adjective-noun pair creates a complex neuron with an R_CDX pointing back to the adjective, such as in "orange cat". For noun-noun pairs such as "seat belt", the R_CDX_NOUN is used to indicate the noun seat that is behaving as an adjective. |
| R_CHILD | Child | NID of my child (class). This sets the NID as a child concept to the present (parent) neuron. For example, if solar~system is the parent neuron, earth would be the NID for an R_CHILD. |
| R_CLUMP | Action (from noun) | CID links to a clump neuron. For "The cow jumped over the moon," the cow neuron (the noun actor) would contain an R_CLUMP pointing off to a clump that describes the action. |
| R_CPLX | Complex | Installed in the parent neuron, this points to a derived child neuron 'complex'. It may be for the purposes of adding an adjective ("blue dog" or "seat belt"), or for creating an instance from a parent class. The NID is the complex derived from this (noun), and the complex has a back-reln of R_CPLX_OF pointing back to the parent. |
| R_CPLX_OF | Complex-of | The first reln of a complex neuron, this is the back-reln to (noun) parent of the complex. NID is noun this complex is derived from. |
| R_EMOT | Attached Emotion | Used to attached emotional content to a neuron (e.g., to give 'warm fuzzies' or concern), this reln directly indicates the emotion to be evoked. The 24 LSBs are composed of a 6-bit Firing level, a 6-bit Count, and then a 12 Neuron_Id to a special neuron (of emotion). The Count is used to . . . (see Luke) |

-continued

| Reln Cmd Code | Usage | Usage of 24 LSBs |
| --- | --- | --- |
| R_EXPER | Link to experience | This reln indicates an experience we had with this particular neuron. E.g., if the neuron refers to 'my Hawaiian vacation', the XID connects to the related experience neuron. Many R_EXPERs can be connected too a single neuron, although only one points to a specific experience. |
| R_IDENTITY | Link to an identity | This reln links the current neuron to a specific identity neuron. The 24 LSBs are an IID pointing to the identity neuron. (The identity neuron is separate from the neuron for a person around which his character and experiences are built. The IID contains certain things specific to all identities, such as name, birthplace, birth-date, and so on.) |
| R_INST | Instance | This reln defines an instance of a class, e.g., Fido versus dog. It can be used in any class or concept neuron to point out a specific occurrence of that class or concept. It points to a new neuron that is built up to describe (my) Fido instance and its characteristics. In that instance neuron is an R_INST_OF back-reln that points back to the class or concept neuron. The Nid in the 24 LSBs points to the new instance neuron.. |
| R_INST_OF | Back-Reln for Instance | This is the back-reln to an R_INST. Found in the instance neuron, its' NID points back to the parent class or concept neuron. See R_INST for more details. |
| R_MADEOF | Made-of | Cakes are made of flour, eggs, water, milk and several other ingredients. This reln may be used inside a noun neuron to indicate what that noun is made up of. In this cake example, there is on R_MADEOF for each ingredient, with the NID in the 24 LSBs pointing to the constituent neuron. Each of the constituent ingredients in turn has a back-reln of R_PARTOF pointing back to the 'cake' (noun) neuron. |
| R_NOT | Negation | Target (noun) is element of this class, Compl the cdx. |
| R_PARENT | Parent Connection | Implies a parent concept, specifically for verbs. The NID is the parent neuron. |
| R_PARTOF | Back-reln converse of MADEOF | An object is made up of other items, and will have R_MADEOF relns pointing to the items that make it up. Conversely, the parts that make up the item each have an R_PARTOF back reln that indicates the class of object of which it is a part of. For example, if a truck is made up of an engine, a chassis and a drive train, truck will have an R_MADEOF pointing to each of these three items. Chassis will in turn have an R_PARTOF pointing back to truck. |
| R_POSSN | Possession | This reln is located in the neuron who is the possessor of something, and its' NID points to the possession. See R_POSSN_OF for an example and more detail. |
| R_POSSN_OF | Owner of a possession | This is a back-reln to R_POSSN; the NID indicates the owner of the possession. For example, I possess a car, so the neuron representing me will therefore contain an R_POSSN. The NID of the R_POSSN points to the item possessed, a car in this case. The car neuron will contain an R_POSSN_OF pointing back to me. The idea of possession should not be confused with what something is made of. |
| R_PREP | Prep phrase | See R_OP for operation. NID points to a specific preposition word, typically a splitter, such as "in (where)". The use of this is described in pictorial form in R_OP. |
| R_PROP | Phys Property (list) | Any noun may have one or more property lists that describe some physical aspect of an object. These may include color, texture, size and the like and are defined in the chapter on Noun Properties. The variable-length lists are recorded in an R_BLOCK list, with the length given in the 8 LSBs, and with the R_PROP enumeration given in bits 8 . . . 15 of the R_BLOCK. R_PROP never stands alone as a reln. |
| R_SPLIT | Same word, new concept | Separate meanings for words such as jump or in can be isolated from each other by using splitter neurons. A splitter neuron is what is pointed to by the text-name Wp, and it will contain only R_SPLIT relns. The NID for each such reln points to the split neuron of the proper meaning. Within the split neuron (e.g., in meaning where versus in meaning time) is an R_SPLIT_OF pointing back to the neuron off the Wp containing the R_SPLITs. To differentiate between the various split-offs, each has an R_ASSOC pointing to its parentage, such as to where or when in the above example. |
| R_SPLIT_OF | R_SPLIT's back Reln | When words such as in or jump can have multiple meanings or concepts, the main neuron pointed to by the text word is a "splitter" neuron. As noted in R_SPLIT above, R_SPLIT relns point to the various flavors of the word, each with its own concept. In each such concept, there is an R_SPLIT_OF pointing back to the base splitter neuron. Example, if jump has 5 meanings, a single splitter neuron for |

| Reln Cmd Code | Usage | Usage of 24 LSBs |
|---|---|---|
| | | jump has 5 R_SPLIT relns, each pointing to a new concept for jump. Each of these jump concepts will have R_ASSOC relns associating them with suitable parentage. They will also each have an R_SPLIT_OF whose NID points back to the master splitter neuron for jump. |
| R_WORLD_VIEW | World view (reln pair) | This is a paired reln, and may be paired with any other (non-paired) reln. It indicates that the next reln is part of the world view of some person. The IID designates the identity of whose belief this item is. If one wants to ignore the viewpoints of others, simply skip over the R_WORLD_VIEW and the reln that follows it, wherever it is found in the neuron. |
| R_WORLD_VIEW_OF | World view | The neuron for person who has expressed a number of personal views gets a back-reln pointing to concepts on which it has a point of view. This reln is found in the neuron (normal, not IID) for the person expressing his view. The NID of this reln points to a concept neuron that references the IID related to this neuron. This is a back-reln in concert with R_WORLD_VIEW, although the latter points to an IID instead of an NID. |

APPENDIX A2

The below table defines the weighted opcodes:

| Reln Cmd Code | Usage | Usage of 24 LSBs |
|---|---|---|
| R_INH | Inhibit neuron From Firing | When the present neuron is firing, inhibit the firing of the neuron whose MD is given by the connection weight. Slight = 10%, suppression = 100%. |
| R_CDX | Percent of Target Firing | This is the means of connecting an adjective to a noun. "Rather red" may imply a red weighted at 30%. The NID points to the adjective. |

APPENDIX B

Universal Roles

These roles may be used in any sentence, no matter the verb type.
ROLE_TIME (tim)
This role includes all time- or date-related phrases, including concurrence.
Time may be a prepositional phrase, an adverb phrase, or an appropriate proform.
Example: "The specimen is leaving the petryi dish now."
ROLE_DURATION (dur)
This role includes all durations, such as "The heated discussion lasted for three hours," and "I've eaten nothing but cookies and coke for a year."
Duration may be a prepositional phrase headed by "for" followed by a period of time, a propositional phrase headed by "during" followed by a noun which denotes something happening over a period of time, or a complementizer phrase connected with 'while' or 'as'.
Examples: "I was talking to the spacemen during the launch."
"Millicent Cow kissed the canary while the dogs looked on."
ROLE_REASON (rsn)
The stated purpose for the action, for example "Katrin knew he wanted her to read that book, so she read it for him," or "Bjorn sold his soul for $20."
Reason may be a prepositional phrase beginning with because, a complementizer phrase beginning with the complementizer so, or in order that.
ROLE_MANNER (man)
An adverb-like phrase which describes how the verb was performed.
Example: "She died with dignity."
Manner may be a prepositional phrase or an adverb phrase.
ROLE_ACCOMPANIMENT (acc)
This semantic role denotes the entities which accompanied the subject of the sentence. For example, "I went to the software store with Anne-Marie." or "Go with God."
The subject of the sentence need not be the Agent, as in "She was attacked with her friend Stacy."
Accompaniment may be a prepositional phrase beginning with alongside or with, or it may be the adverb phrase together.
ROLE_INSTRUMENT (ins)
The Agent is the initiator of the action; the Instrument is the thing that the Agent used.
Example: "I brutally murdered him with a spatula."
Note that an Agent need not be in the sentence for Instrument to be present, for example, in "He was killed by the sword," the one doing the killing (the Agent) is not there, but the sword (the Instrument) is.
Instrument may be a noun phrase or gerund phrase.
Regular Roles
These roles must be assigned by the verb; they may not appear in just any sentence.
ROLE_ACTOR (atr)
The person which does the action, as in "The redcoats are coming!"
Actor may be a noun phrase, gerund phrase, or complementizer phrase.
ROLE_EXPERIENCER (exp)
Experiencer is the noun which undergoes change or feeling, as in "Jonny feels very sad today," or "He attacked me without warning!" Note: All state verbs must assign an exp in active cps.
The verb "to become" assigns an experiencer based on the following line of reasoning: The verb "to change," as in "Rudolph changed Nancy into a nicer person," assigns an Actor (Rudolph) and an Experiencer (Nancy). In "to become," as in "I became nicer," the Actor is changing himself to be nicer. In our model, we have called him the Experiencer, though this is arbitrary and he just as easily could be the Actor.

Experiencer may be a noun phrase, gerund phrase, or complementizer phrase.

ROLE_THEME (thm)

Similar to Topic. As in, "I joined you in your quest for truth," or "Quit involving me in your problems," "Dating involves lots of money."

Themes may be either abstract nouns or gerunds, or complementizer phrases.

ROLE_EFFECT (eff)

The outcome of an action. An Effect may only be assigned if the Effect noun came into existence because of the verb. That is, you must be able to replace the original verb with "effect" (not "affect"), and the sentence must hold true.

For example, in the sentence "She baked cookies.", it is saying that she made cookies—she caused the cookies to exist by the act of baking. Thus, "cookies" is the Effect.

On the other hand, in the sentence "She baked cookie dough.", it is saying that she put the cookie dough through a process of baking, but not that she made it cookie dough by baking it. Therefore, "cookie dough" would not be considered Effect, but Experiencer.

Effect does not require an Actor to be assigned. The sentence "I died a painful death." is an example of this. "I", in this case, is an Experiencer, not an agent.

Effect may be a noun phrase OR an adjective due to a state or state verb—I made her angry. 'her angry' is the effect.

Specially-Assigned Roles

These roles may only be assigned by certain kinds of verbs

ROLE_STATE (sta)

This semantic role is for the express use of state verbs, such as "to be," as in "I am happy," and also for sensing verbs, such as "look," as in "You look terrible." Note that these are not noun phrases, but adjective phrases. This is a very rare phenomenon and very restricted—adjectives are only included as part of the predicate argument structure here because they are required by the verb. Other verbs that assign to adjective phrases are "act," as in "You're acting strange today," "seem" as in "You seem quite nice," and "stay" as in "I stay warm most of the time." State may be an adjective phrase only.

ROLE_IDENTITY (idt)

Identity was created for, but not limited to, being verbs, as in "I am Hannah". "Hannah" receives the role of the identity, because it refers to the same entity as does the subject. Any noun phrase that is not the subject but is its co-referent is assigned the role of identity. Identity may be a noun phrase, gerund phrase, or complementizer phrase.

ROLE_MEASURE (msr)

All measurement verbs assign this role, such as "Pterodactyl's wingspan measures forty feet." Measure may be a noun phrase or gerund phrase. This is the only role which can be a NP, but cannot function as the Object of a sentence.

What is claimed is:

1. A method for emulating human behavior, the method comprising:

providing a plurality of neurons, wherein one neuron constitutes a predetermined activity neuron that represents one concept and at least one concept is that of an activity associated with a type of verb;

defining relational connections between the activity neuron and a second group of the plurality of neurons, each of the second group of the plurality of neurons representing a fixed concept that is unique to the activity associated with the activity neuron;

wherein the meaning of the activity neuron is determined by a relational connection between the activity neuron and the second group of the plurality of neurons established through the relational connection and wherein the relationship between the activity neuron associated with the concept of activity and the second group of neurons comprises a framework of neurons uniquely related to the at least one concept of the predetermined activity associated with the type of verb associated with that predetermined activity;

providing a plurality of verb neurons, each representing the concept of an associated verb and each associated neuron defined by a plurality of relationships to other neurons and each having a relationship defined to the activity neuron;

providing a plurality of neurons associated with other grammatical elements that can be found in a bounded grammatical structure;

parsing an input bounded grammatical structure to derive the verb associated with the bounded structure and the other associated grammatical elements;

determining if the verb in the bounded structure is a verb of the type associated with the activity neuron;

determining which of the relationships from the activity neuron to the associated second group of neurons exists which will define the relationship of the parsed grammatical elements to the parsed verb; and creating a clump neuron defining all of the associated neurons for the parsed grammatical structure and the associated relationships.

2. The method of claim 1, wherein the grammatical structure is a sentence.

3. The method of claim 1, wherein the predetermined activity is a transitive activity and the type of verb is a transitive verb.

4. The method of claim 3, wherein the transitive verb constitutes the grammatical role of the verb in the grammatical structure and the second group of neurons defines the restrictions on the transitive verb relative to the other grammatical elements, such that an actor and a recipient if the activity can be defined and attributed their associated roles in the transitory activity.

* * * * *